(12) United States Patent
Li et al.

(10) Patent No.: US 12,309,712 B2
(45) Date of Patent: May 20, 2025

(54) SUPPORT OF HIGH PATHLOSS MODE

(71) Applicant: QUALCOMM Incorporated, San Diego, CA (US)

(72) Inventors: Junyi Li, Fairless Hills, PA (US); Juergen Cezanne, Ocean Township, NJ (US); Andrzej Partyka, Bedminster, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/052,706

(22) Filed: Nov. 4, 2022

(65) Prior Publication Data

US 2023/0147731 A1 May 11, 2023

Related U.S. Application Data

(63) Continuation of application No. 16/807,008, filed on Mar. 2, 2020, now Pat. No. 11,496,970.

(Continued)

(51) Int. Cl.
*H04W 52/24* (2009.01)
*H04L 1/00* (2006.01)
(Continued)

(52) U.S. Cl.
CPC ......... *H04W 52/242* (2013.01); *H04L 1/0003* (2013.01); *H04W 16/14* (2013.01); *H04W 56/001* (2013.01); *H04W 88/14* (2013.01)

(58) Field of Classification Search
CPC . H04W 52/242; H04W 16/14; H04W 56/001; H04W 88/14; H04L 1/0003;
(Continued)

(56) References Cited

U.S. PATENT DOCUMENTS 6,137,826 A * 10/2000 Boesch ................. H04B 1/707
455/104
7,016,649 B1  3/2006 Narasimhan et al.
(Continued)

FOREIGN PATENT DOCUMENTS

CN      101341676 A    1/2009
CN      101569112 A    10/2009
(Continued)

OTHER PUBLICATIONS

AT&T: "Enhancements to Support NR Backhaul Links," 3GPP Draft, 3GPP TSG RAN WG1 Meeting #94bis, R1-1810690, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051518094, 15 pages, Chapter 2.3 "Frame Structure Design andBackhaul Multiplexing".

(Continued)

*Primary Examiner* — Afshawn M Towfighi
(74) *Attorney, Agent, or Firm* — Holland & Hart LLP/QUALCOMM Incorporated

(57) ABSTRACT

Methods, systems, and devices for wireless communications are described. A wireless device (e.g., a user equipment and/or base station) may operate in a first mode in a wireless network over a radio frequency spectrum band. The wireless device may receive a signal indicating that a value of the radio frequency spectrum band has satisfied a threshold value. The wireless device may switch, based at least in part on the signal indicating that the value has satisfied the threshold value, from the first mode to a second mode for wireless communications in the wireless network, wherein a first length of a first synchronization signal block associated with the first mode is shorter than a second length of a (Continued)

second synchronization signal block associated with the second mode.

58 Claims, 12 Drawing Sheets

Related U.S. Application Data

(60) Provisional application No. 62/814,564, filed on Mar. 6, 2019.

(51) Int. Cl.
*H04W 16/14* (2009.01)
*H04W 56/00* (2009.01)
*H04W 88/14* (2009.01)

(58) Field of Classification Search
CPC ..... H04L 5/0098; H04L 5/001; H04L 5/0048; H04L 1/0009; H04L 1/0015
See application file for complete search history.

(56) References Cited

U.S. PATENT DOCUMENTS

| | | | |
|---|---|---|---|
| 8,327,002 | B1 | 12/2012 | Van Dussen et al. |
| 9,319,886 | B2* | 4/2016 | Jo .................. H04W 28/04 |
| 9,590,707 | B1 | 3/2017 | Baik et al. |
| 9,877,322 | B1* | 1/2018 | Sung .............. H04W 72/0446 |
| 10,015,691 | B2 | 7/2018 | Damnjanovic et al. |
| 10,219,182 | B1 | 2/2019 | Hahn et al. |
| 10,334,588 | B2 | 6/2019 | Sadek |
| 10,736,054 | B2* | 8/2020 | Jiang ................ H04W 52/322 |
| 11,438,808 | B2 | 9/2022 | Li et al. |
| 11,445,408 | B2 | 9/2022 | Li et al. |
| 11,463,964 | B2 | 10/2022 | Li et al. |
| 11,477,747 | B2 | 10/2022 | Li et al. |
| 11,496,970 | B2 | 11/2022 | Li et al. |
| 11,510,071 | B2 | 11/2022 | Li et al. |
| 11,937,193 | B2 | 3/2024 | Rico Alvarino et al. |
| 2004/0192323 | A1 | 9/2004 | Valenzuela |
| 2005/0106910 | A1 | 5/2005 | Chiu |
| 2006/0285504 | A1 | 12/2006 | Dong et al. |
| 2008/0025254 | A1 | 1/2008 | Love et al. |
| 2008/0159203 | A1 | 7/2008 | Choi et al. |
| 2008/0189970 | A1 | 8/2008 | Wang et al. |
| 2008/0268786 | A1 | 10/2008 | Baker et al. |
| 2009/0028065 | A1 | 1/2009 | Iwai et al. |
| 2009/0046653 | A1 | 2/2009 | Singh et al. |
| 2009/0210474 | A1 | 8/2009 | Shao et al. |
| 2010/0040036 | A1 | 2/2010 | Ofuji et al. |
| 2010/0041413 | A1 | 2/2010 | Sumasu et al. |
| 2010/0091725 | A1 | 4/2010 | Ishii |
| 2010/0113041 | A1 | 5/2010 | Bienas et al. |
| 2010/0120360 | A1 | 5/2010 | Haustein et al. |
| 2010/0232352 | A1 | 9/2010 | Merlin et al. |
| 2010/0309803 | A1 | 12/2010 | Toh et al. |
| 2010/0329195 | A1 | 12/2010 | Abraham et al. |
| 2010/0331030 | A1 | 12/2010 | Nory et al. |
| 2011/0002227 | A1 | 1/2011 | Sampath et al. |
| 2011/0085502 | A1 | 4/2011 | Malladi |
| 2011/0125488 | A1 | 5/2011 | Birmingham |
| 2011/0143800 | A1 | 6/2011 | Han et al. |
| 2011/0188598 | A1 | 8/2011 | Lee et al. |
| 2011/0249578 | A1 | 10/2011 | Nayeb Nazar et al. |
| 2011/0261742 | A1 | 10/2011 | Wentink |
| 2012/0157108 | A1 | 6/2012 | Boudreau et al. |
| 2013/0003788 | A1 | 1/2013 | Marinier et al. |
| 2013/0028228 | A1 | 1/2013 | Nakayama et al. |
| 2013/0034066 | A1 | 2/2013 | Kakishima et al. |
| 2013/0089048 | A1 | 4/2013 | Damnjanovic et al. |
| 2013/0265916 | A1 | 10/2013 | Zhu et al. |
| 2013/0288695 | A1 | 10/2013 | Okino |
| 2013/0301454 | A1 | 11/2013 | Seol et al. |
| 2014/0071954 | A1 | 3/2014 | Au et al. |
| 2014/0092865 | A1 | 4/2014 | Heo et al. |
| 2014/0098761 | A1 | 4/2014 | Lee et al. |
| 2014/0105046 | A1 | 4/2014 | Tellado et al. |
| 2014/0105136 | A1 | 4/2014 | Tellado et al. |
| 2014/0153390 | A1 | 6/2014 | Ishii et al. |
| 2014/0206382 | A1 | 7/2014 | Shabtay |
| 2014/0226551 | A1 | 8/2014 | Ouchi et al. |
| 2014/0254537 | A1 | 9/2014 | Kim et al. |
| 2014/0274141 | A1* | 9/2014 | Gholmieh ............... H04W 4/02 455/456.3 |
| 2014/0314000 | A1 | 10/2014 | Liu et al. |
| 2014/0362716 | A1 | 12/2014 | Zhang et al. |
| 2015/0011236 | A1 | 1/2015 | Kazmi et al. |
| 2015/0358960 | A1 | 12/2015 | Zhang et al. |
| 2015/0365939 | A1 | 12/2015 | Zhang et al. |
| 2015/0373689 | A1 | 12/2015 | Tabet et al. |
| 2016/0066301 | A1 | 3/2016 | Zhu et al. |
| 2016/0088648 | A1 | 3/2016 | Xue et al. |
| 2016/0270116 | A1 | 9/2016 | Lin et al. |
| 2016/0286450 | A1 | 9/2016 | Badic et al. |
| 2016/0295595 | A1 | 10/2016 | Chae et al. |
| 2016/0308280 | A1 | 10/2016 | Shimizu |
| 2016/0315686 | A1 | 10/2016 | Song et al. |
| 2017/0034837 | A1 | 2/2017 | Lopez-Perez et al. |
| 2017/0048772 | A1 | 2/2017 | Gheorghiu et al. |
| 2017/0064743 | A1 | 3/2017 | Lei et al. |
| 2017/0070961 | A1* | 3/2017 | Bharadwaj .......... H04W 52/228 |
| 2017/0086080 | A1 | 3/2017 | Sun et al. |
| 2017/0086137 | A1 | 3/2017 | Sun et al. |
| 2017/0093038 | A1 | 3/2017 | Li et al. |
| 2017/0215201 | A1 | 7/2017 | Kim et al. |
| 2017/0238261 | A1 | 8/2017 | Benjebbour et al. |
| 2017/0265169 | A1 | 9/2017 | Chen et al. |
| 2017/0290008 | A1 | 10/2017 | Tooher et al. |
| 2017/0310426 | A1 | 10/2017 | Fan et al. |
| 2017/0325164 | A1 | 11/2017 | Lee et al. |
| 2018/0007724 | A1 | 1/2018 | Kazmi et al. |
| 2018/0020452 | A1 | 1/2018 | Yerramalli et al. |
| 2018/0027437 | A1 | 1/2018 | Vitthaladevuni et al. |
| 2018/0042031 | A1 | 2/2018 | Hampel et al. |
| 2018/0049137 | A1 | 2/2018 | Li et al. |
| 2018/0054339 | A1 | 2/2018 | Sun et al. |
| 2018/0062770 | A1 | 3/2018 | Reial et al. |
| 2018/0092073 | A1 | 3/2018 | Nogami et al. |
| 2018/0098323 | A1 | 4/2018 | Zhang et al. |
| 2018/0124790 | A1 | 5/2018 | Yerramalli |
| 2018/0132197 | A1* | 5/2018 | Lin ..................... H04W 52/242 |
| 2018/0145798 | A1 | 5/2018 | Suzuki et al. |
| 2018/0145819 | A1 | 5/2018 | Axmon et al. |
| 2018/0160401 | A1 | 6/2018 | Goto et al. |
| 2018/0176948 | A1 | 6/2018 | Islam et al. |
| 2018/0198181 | A1* | 7/2018 | Fukasawa ................ H03F 3/24 |
| 2018/0199341 | A1* | 7/2018 | Baldemair .......... H04L 27/0008 |
| 2018/0219590 | A1 | 8/2018 | Matsuda et al. |
| 2018/0220399 | A1 | 8/2018 | Davydov et al. |
| 2018/0220465 | A1 | 8/2018 | Zhang et al. |
| 2018/0234337 | A1 | 8/2018 | Goliya et al. |
| 2018/0242264 | A1 | 8/2018 | Pelletier et al. |
| 2018/0249492 | A1 | 8/2018 | Xu et al. |
| 2018/0262288 | A1 | 9/2018 | Gao et al. |
| 2018/0309553 | A1 | 10/2018 | Cao et al. |
| 2018/0324716 | A1 | 11/2018 | Jeon et al. |
| 2018/0324853 | A1* | 11/2018 | Jeon .................. H04W 74/006 |
| 2018/0367263 | A1 | 12/2018 | Ying et al. |
| 2018/0375619 | A1 | 12/2018 | Hwang et al. |
| 2018/0376464 | A1* | 12/2018 | Hosseini ............... H04L 5/0094 |
| 2019/0007181 | A1 | 1/2019 | Marinier et al. |
| 2019/0044639 | A1 | 2/2019 | Ouchi et al. |
| 2019/0044647 | A1 | 2/2019 | Tomeba et al. |
| 2019/0053072 | A1 | 2/2019 | Kundargi et al. |
| 2019/0053205 | A1 | 2/2019 | Tomeba et al. |
| 2019/0075597 | A1 | 3/2019 | Yerramalli et al. |
| 2019/0082457 | A1 | 3/2019 | Zhou et al. |
| 2019/0089498 | A1 | 3/2019 | Pelletier et al. |
| 2019/0116605 | A1 | 4/2019 | Luo et al. |
| 2019/0182870 | A1 | 6/2019 | Shih et al. |
| 2019/0208538 | A1 | 7/2019 | Lee et al. |
| 2019/0215766 | A1* | 7/2019 | Wu ..................... H04W 24/02 |
| 2019/0215896 | A1 | 7/2019 | Zhou et al. |

(56) References Cited

U.S. PATENT DOCUMENTS

| | | |
|---|---|---|
| 2019/0253136 A1* | 8/2019 | Makki .................. H04B 7/0617 |
| 2019/0260495 A1* | 8/2019 | Nammi ................. H04L 1/0016 |
| 2019/0261399 A1 | 8/2019 | Munier et al. |
| 2019/0288765 A1 | 9/2019 | Lee et al. |
| 2019/0313406 A1 | 10/2019 | Liu et al. |
| 2019/0327123 A1 | 10/2019 | Wang et al. |
| 2019/0349079 A1 | 11/2019 | Novlan et al. |
| 2020/0015209 A1 | 1/2020 | Zhang |
| 2020/0068497 A1 | 2/2020 | Gong et al. |
| 2020/0107335 A1 | 4/2020 | Xue et al. |
| 2020/0107355 A1 | 4/2020 | Zhou |
| 2020/0145860 A1 | 5/2020 | Koskela et al. |
| 2020/0146059 A1 | 5/2020 | Cirik et al. |
| 2020/0205083 A1 | 6/2020 | Chen et al. |
| 2020/0288409 A1* | 9/2020 | Li ........................ H04B 7/0626 |
| 2020/0296673 A1 | 9/2020 | Ouchi et al. |
| 2020/0328850 A1 | 10/2020 | Feng |
| 2020/0337028 A1 | 10/2020 | Li et al. |
| 2021/0022091 A1 | 1/2021 | Li et al. |
| 2021/0037441 A1* | 2/2021 | Khalid ................. H04W 36/22 |
| 2021/0045076 A1* | 2/2021 | Tomeba .............. H04W 56/001 |
| 2021/0084693 A1 | 3/2021 | Zhang et al. |
| 2021/0136639 A1 | 5/2021 | Osawa |
| 2021/0143959 A1 | 5/2021 | Xu et al. |
| 2021/0168782 A1 | 6/2021 | Hamidi-Sepehr et al. |
| 2021/0195674 A1 | 6/2021 | Park et al. |
| 2021/0204307 A1 | 7/2021 | Lee et al. |
| 2021/0235386 A1 | 7/2021 | Zhang et al. |
| 2021/0314892 A1 | 10/2021 | Rico Alvarino et al. |
| 2021/0410084 A1 | 12/2021 | Li et al. |
| 2022/0174694 A1 | 6/2022 | Hwang et al. |
| 2022/0394561 A1 | 12/2022 | Li et al. |
| 2023/0027300 A1 | 1/2023 | Li et al. |
| 2023/0052171 A1 | 2/2023 | Li et al. |
| 2023/0069736 A1 | 3/2023 | Li et al. |
| 2023/0085790 A1 | 3/2023 | Li et al. |
| 2023/0247577 A1 | 8/2023 | Rico Alvarino et al. |
| 2024/0015757 A1 | 1/2024 | Li et al. |

FOREIGN PATENT DOCUMENTS

| | | |
|---|---|---|
| CN | 102792625 A | 11/2012 |
| CN | 103220702 A | 7/2013 |
| CN | 105052068 A | 11/2015 |
| CN | 105103467 A | 11/2015 |
| CN | 106688193 A | 5/2017 |
| CN | 107113902 A | 8/2017 |
| CN | 108028743 A | 5/2018 |
| CN | 108781103 A | 11/2018 |
| EP | 1515471 A1 | 3/2005 |
| EP | 1641188 A1 | 3/2006 |
| EP | 2120364 A1 | 11/2009 |
| EP | 2504942 A1 | 10/2012 |
| EP | 3179660 A1 | 6/2017 |
| KR | 20180136855 A | 12/2018 |
| WO | WO-2015089253 A2 | 6/2015 |
| WO | WO-2016040290 A1 | 3/2016 |
| WO | WO-2016061382 | 4/2016 |
| WO | WO-2017040002 | 3/2017 |
| WO | WO-2019032799 A1 | 2/2019 |
| WO | WO-2019070579 A1 | 4/2019 |
| WO | WO-2019102065 A1 | 5/2019 |

OTHER PUBLICATIONS

Huawei, et al., "Physical Layer Enhancement on IAB", 3GPP TSG-RAN WG1 Meeting #92bis, 3GPP Draft; R1-1803695, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), 6 Pages, XP051425992, Sections 2.1 and 2.2.

International Search Report and Written Opinion—PCT/US2020/020825—ISAEPO—dated Jun. 17, 2020.

LG Electronics: "Discussions on Mechanisms to Support NR IAB Scenarios", 3GPP Draft, 3GPP TSG RAN WG1 Meeting #94bis, R1-1810273, Discussions on NR IAB Support_V0, 3rd Generation Partnership Project, Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018, XP051517687, 7 pages, Chapter 6 "Access and Backhaul Timing" Chapter 7 "TDM Patterns", Paragraph [0007].

Qualcomm Incorporated: "Inter-IAB-Node Discovery", 3GPP Draft, 3GPP TSG RAN WG1 Meeting #93, R1-1807395, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 12, 2018 (May 12, 2018), XP051463086, 8 Pages, paragraph [0003].

Qualcomm Incorporated: "Resource Allocation for PUCCH", 3GPP TSG RAN WG1 Meeting #90b, R1-1718806, 3rd Generation Partnership Project, Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017, XP051341951, 10 Pages.

3GPP TS 38.213: "3rd Generation Partnership Project; Technical Specification Group Radio Access Network; NR; Physical Layer Procedures for Control (Release 15)", 3GPP Draft, 38213-F50, 3rd Generation Partnership Project (3GPP), Mobile Competence Centre, 650, Route Des Lucioles, F-06921 Sophia-Antipolis Cedex, France, vol. RAN WG1, No. V15.5.0 (Mar. 2019), Mar. 27, 2019 (Mar. 27, 2019), 104 Pages, XP051722950, XP051686992, p. 12-p. 74, section 7.3.1.

Spreadtrum Communications: "On RS Multiplexing", 3GPP TSG RAN WG1 Meeting #90, R1-1713051_On RS Multiplexing_Final, 3rd Generation Partnership Project, Mobile Competence Centre, 650, Route Des Lucioles, F-06921 Sophia-Antipolis Cedex, France, vol. RAN WG1, No. Prague, Czech Rep, Aug. 21, 2017-Aug. 25, 2017, Aug. 20, 2017, XP051315860, 8 Pages, Sections 4-5.

* cited by examiner

SUPPORT OF HIGH PATHLOSS MODE

CROSS REFERENCE

The present Application for Patent is a Continuation of U.S. patent application Ser. No. 16/807,008 by LI et al., entitled "SUPPORT OF HIGH PATHLOSS MODE" filed Mar. 2, 2020, which claims the benefit of U.S. Provisional Patent Application No. 62/814,564 by LI et al., entitled "SUPPORT OF HIGH PATHLOSS MODE," filed Mar. 6, 2019, assigned to the assignee hereof, and expressly incorporated herein.

INTRODUCTION

The following relates to wireless communications, and more specifically to managing a link budget in a pathloss environment.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Communications between the base station and the UE may occur over a wireless channel (e.g., a radio frequency spectrum band) between the transmitting device and the receiving device. Due to a variety of conditions, the channel (or path) between the communicating devices may experience interference, blockage, etc., such that the wireless communications may fail. For example, some techniques may adjust various parameters used to perform the wireless communications over the channel (or path) to adapt to the channel conditions. However, such techniques are only suitable when the pathloss (e.g., the interference, blockage, etc.) between the communicating devices is within a given range. However, some deployment scenarios may experience excessive pathloss, e.g., such as in a millimeter wave (mmW) network, that exceeds the ability of some techniques to accommodate larger variations in pathloss. For example, some techniques may not support wireless communications when the pathloss value/transmission power level between the communicating devices satisfies or otherwise exceeds a threshold value. In these instances, wireless networks may be unable to support wireless communications.

SUMMARY

A method of wireless communications at a wireless device is described. The method may include operating in a first mode in a wireless network over a radio frequency spectrum band, receiving a signal indicating that a value of the radio frequency spectrum band has satisfied a threshold value, and switching, based on the signal indicating that the value has satisfied the threshold value, from the first mode to a second mode for wireless communications in the wireless network, where a first length of a first synchronization signal block associated with the first mode is shorter than a second length of a second synchronization signal block associated with the second mode.

An apparatus for wireless communications at a wireless device is described. The apparatus may include a processor and memory coupled to the processor, the processor and memory configured to operate in a first mode in a wireless network over a radio frequency spectrum band, receive a signal indicating that a value of the radio frequency spectrum band has satisfied a threshold value, and switch, based on the signal indicating that the value has satisfied the threshold value, from the first mode to a second mode for wireless communications in the wireless network, where a first length of a first synchronization signal block associated with the first mode is shorter than a second length of a second synchronization signal block associated with the second mode.

Another apparatus for wireless communications at a wireless device is described. The apparatus may include means for operating in a first mode in a wireless network over a radio frequency spectrum band, receiving a signal indicating that a value of the radio frequency spectrum band has satisfied a threshold value, and switching, based on the signal indicating that the value has satisfied the threshold value, from the first mode to a second mode for wireless communications in the wireless network, where a first length of a first synchronization signal block associated with the first mode is shorter than a second length of a second synchronization signal block associated with the second mode.

A non-transitory computer-readable medium storing code for wireless communications at a wireless device is described. The code may include instructions executable by a processor to operate in a first mode in a wireless network over a radio frequency spectrum band, receive a signal indicating that a value of the radio frequency spectrum band has satisfied a threshold value, and switch, based on the signal indicating that the value has satisfied the threshold value, from the first mode to a second mode for wireless communications in the wireless network, where a first length of a first synchronization signal block associated with the first mode is shorter than a second length of a second synchronization signal block associated with the second mode.

In some examples of the method, apparatuses, and non-transitory computer-readable medium described herein, the wireless network includes an integrated access and backhaul (IAB) network.

Some examples of the method, apparatuses, and non-transitory computer-readable medium described herein may further include operations, features, means, or instructions for performing wireless backhaul communications with a second wireless device of the IAB network according to the second mode.

Some examples of the method, apparatuses, and non-transitory computer-readable medium described herein may further include operations, features, means, or instructions for performing wireless backhaul communications with a third wireless device of the IAB network according to the first mode or the second mode.

In some examples of the method, apparatuses, and non-transitory computer-readable medium described herein, the value comprises a pathloss value and the threshold value comprises a threshold pathloss value.

Some examples of the method, apparatuses, and non-transitory computer-readable medium described herein may further include operations, features, means, or instructions for determining that the signal was received at a received power level below a threshold level, where the signal being received at the received power level below the threshold level indicates that the pathloss value may have surpassed the threshold pathloss value.

Some examples of the method, apparatuses, and non-transitory computer-readable medium described herein may further include operations, features, means, or instructions for transmitting an indication to one or more other wireless devices that the wireless device may have switched to the second mode.

Some examples of the method, apparatuses, and non-transitory computer-readable medium described herein may further include operations, features, means, or instructions for decoding the signal to determine that the value may have surpassed the threshold value.

In some examples of the method, apparatuses, and non-transitory computer-readable medium described herein, the signal includes at least one of an in-band signal, an out-of-band signal, a broadcast signal, a unicast signal, or a combination thereof.

In some examples of the method, apparatuses, and non-transitory computer-readable medium described herein, a first length of a first reference signal associated with the first mode may be shorter than a second length of a second reference signal associated with the second mode.

In some examples of the method, apparatuses, and non-transitory computer-readable medium described herein, a first modulation and coding scheme (MCS) associated with the first mode may be higher than a second MCS associated with the second mode.

In some examples of the method, apparatuses, and non-transitory computer-readable medium described herein, a first bandwidth associated with the first mode may be wider than a second bandwidth associated with the second mode.

In some examples of the method, apparatuses, and non-transitory computer-readable medium described herein, a first beam width associated with the first mode may be narrower than a second beam width associated with the second mode.

In some examples of the method, apparatuses, and non-transitory computer-readable medium described herein, the radio frequency spectrum band is an unlicensed radio frequency spectrum band.

In some examples of the method, apparatuses, and non-transitory computer-readable medium described herein, the wireless network is a millimeter wave wireless network.

DETAILED DESCRIPTION

Figure 1:
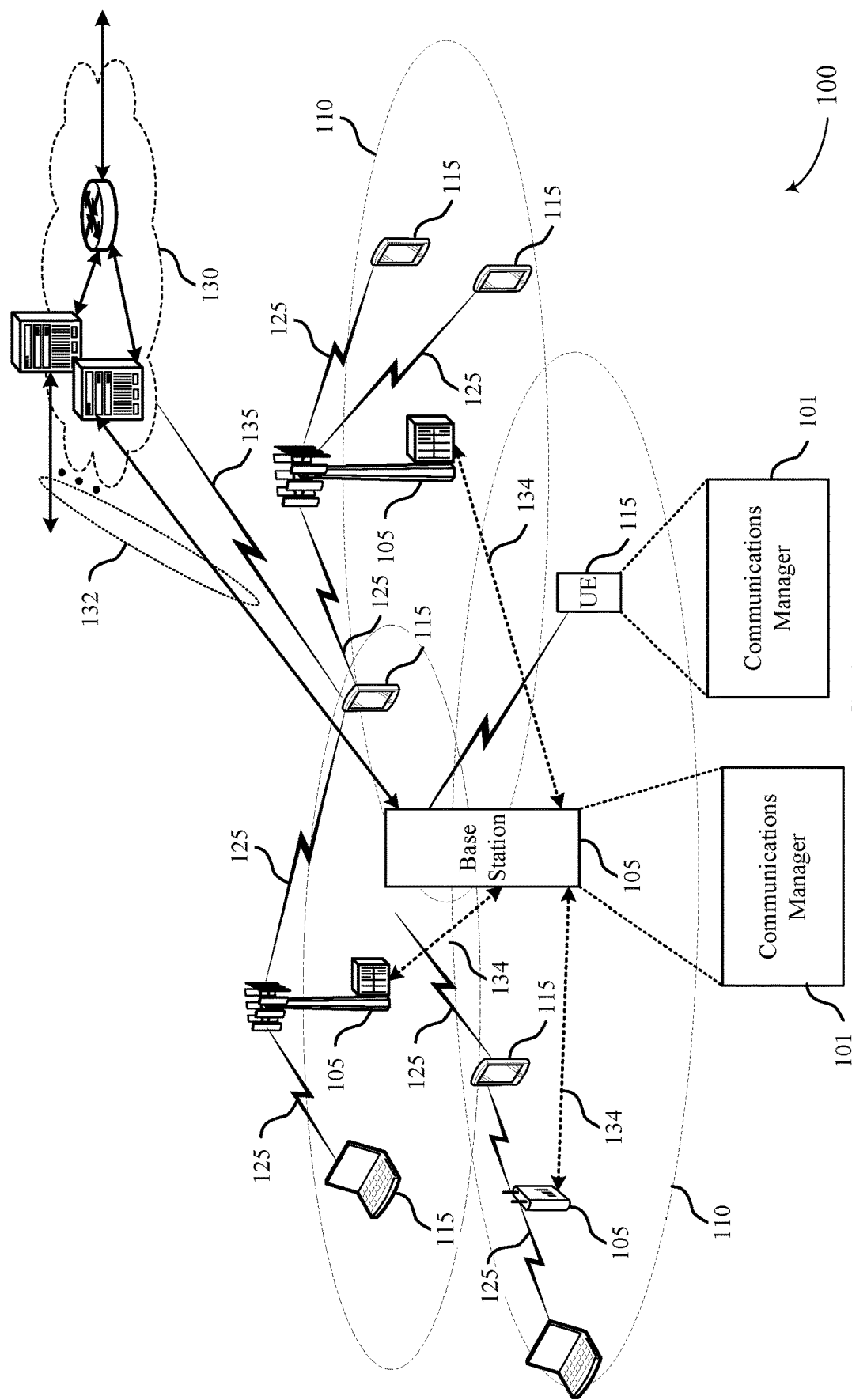
FIG. 1 illustrates an example of a system for wireless communications that supports use of a high pathloss mode, in accordance with one or more aspects of the present disclosure.

Wireless communication systems may operate in mmW frequency ranges, e.g., 28 GHz, 40 GHz, 60 GHz, etc. Wireless communications at these frequencies may be associated with increased signal attenuation (e.g., pathloss), which may be influenced by various factors, such as temperature, barometric pressure, diffraction, blockage, etc. As a result, signal processing techniques, such as beamforming, may be used to coherently combine energy and overcome the pathlosses at these frequencies. Due to the increased amount of pathloss in mmW communication systems, transmissions from the base station and/or the UE may be beamformed. Moreover, a receiving device may use beamforming techniques to configure antenna(s) and/or antenna array(s) such that transmissions are received in a directional manner.

Moreover, wireless communications may have varying reliability requirements to ensure that information is communicated between wireless devices, e.g., UE(s) and/or base station(s). To ensure wireless communications satisfy the reliability requirements, some techniques may provide a mechanism to respond to limited changes in pathloss values. For example, such techniques may be configured to adapt to relatively minor pathloss changes, but may fail when the pathloss/transmission power level between communicating devices satisfies or otherwise exceeds a threshold value. This may interfere with, and sometimes prevent, wireless communications over the radio frequency spectrum band.

Accordingly, aspects of the described techniques provide various mechanisms for maintaining a link budget in a challenging pathloss environment. Broadly, the described techniques enable wireless devices communicating in a wireless network to utilize a high pathloss/transmission power level mode when the pathloss/transmission power level value satisfies (or exceeds) a threshold value. For example, one or more wireless devices (e.g., base station(s) and/or UE(s)) may be performing wireless communications in a wireless network over a radio frequency spectrum band. In some aspects, this may include the wireless device(s) operating in a first mode (e.g., a low pathloss mode, a normal transmission power level mode, or normal mode) in the wireless network. The wireless device(s) may receive a signal that indicates that the value has satisfied (or exceeded) a threshold. As one example, the wireless device(s) may monitor the channel (e.g., monitor signals being communicated over the channel) and determine that the pathloss value/transmission power level has satisfied (or exceeded) a threshold value. In another example, the wireless device(s) may receive a signal from another wireless device indicating that the value has satisfied (or exceeded) the threshold value. Accordingly, the wireless device(s) may switch from the first mode (e.g., a low pathloss/transmission power level mode) to a second mode (e.g., high pathloss/low transmission power level mode) to continue to perform wireless communications over the wireless network. Broadly, the second mode (e.g., the high pathloss mode) may include one or more parameters to support continued wireless communications in the high pathloss environment. Examples of the parameters that may be adjusted may include, but are not limited to, the length of the synchronization signal block (SSB) in the high pathloss mode being longer, the length of a reference signal in the high pathloss mode being longer, a MCS in the high pathloss mode being lower, and the like. Accordingly, the wireless devices may continue to perform wireless communications in the wireless network in the high pathloss environment according to the second mode (e.g., the high pathloss/low transmission power level mode).

Aspects of the disclosure are initially described in the context of a wireless communication system. Aspects of the disclosure are further illustrated by and described with reference to apparatus diagrams, system diagrams, and flowcharts that relate to support of high pathloss mode.

FIG. 1 illustrates an example of a wireless communication system 100 that supports use of a high pathloss mode, in accordance with one or more aspects of the present disclosure. The wireless communication system 100 includes base stations 105, UEs 115, and a core network 130. In some examples, the wireless communication system 100 may be a LTE network, an LTE-A network, an LTE-A Pro network, or a NR network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, e.g., in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ T. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a wireless device (e.g., a UE 115) may include a communications manager 101 that is configured to operate in a first mode in a wireless network over a radio frequency spectrum band. The communications manager 101 may be configured to receive a signal indicating that a value of the radio frequency spectrum band has satisfied a threshold value. The communications manager 101 may be configured to switch, based at least in part on the signal indicating that the value has satisfied the threshold value, from the first mode to a second mode for wireless communications in the wireless network, wherein a first length of a first SSB associated with the first mode is shorter than a second length of a second SSB associated with the second mode.

In some aspects, a wireless device (e.g., a base station 105) may include the communications manager 101 that is configured to operate in a first mode in a wireless network over a radio frequency spectrum band. The communications manager 101 may be configured to receive a signal indicating that a value of the radio frequency spectrum band has satisfied a threshold value. The communications manager 101 may be configured to switch, based at least in part on the signal indicating that the value has satisfied the threshold value, from the first pathloss mode to a second mode for wireless communications in the wireless network, wherein a first length of a first SSB associated with the first mode is shorter than a second length of a second SSB associated with the second mode.

Figure 2:
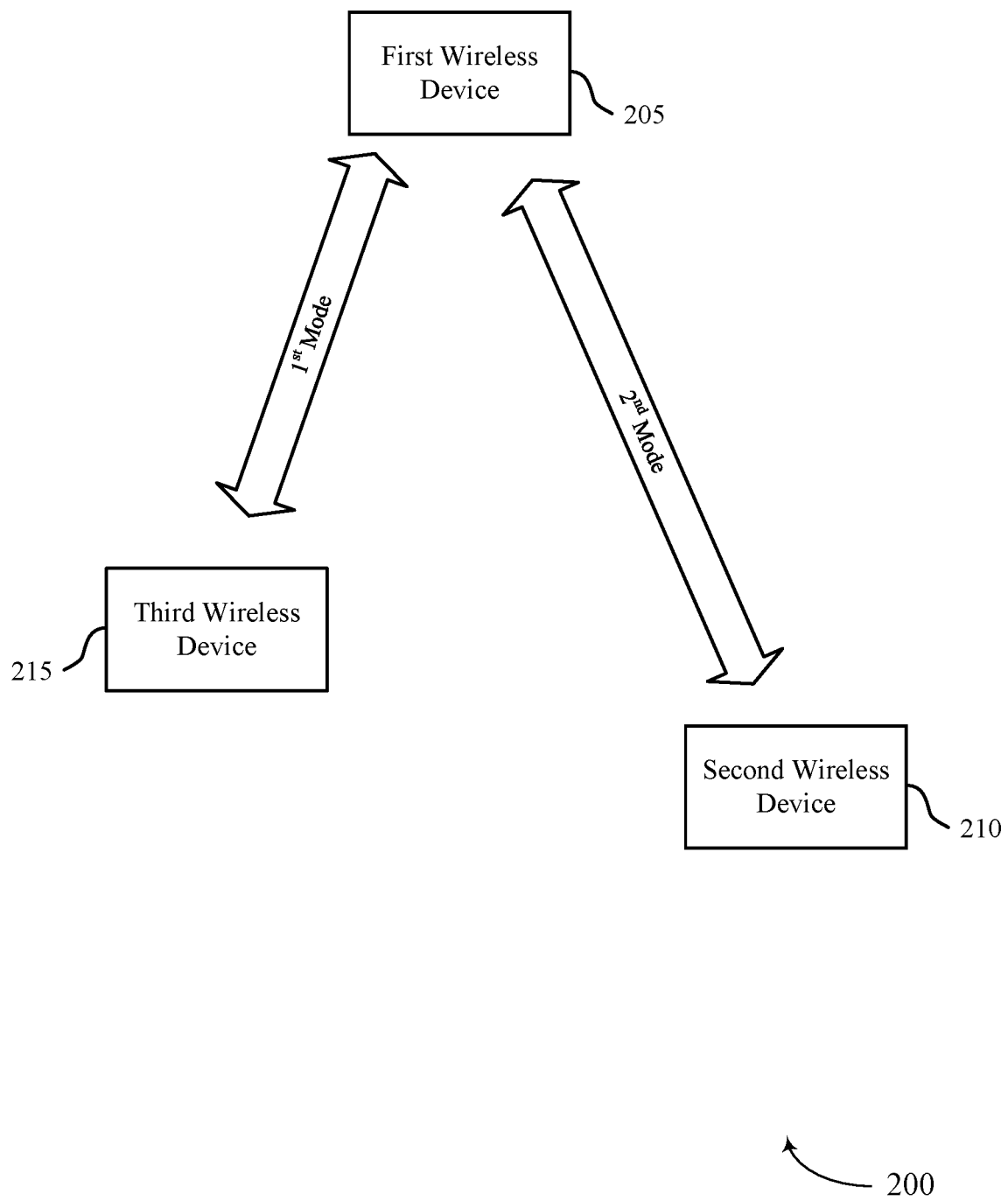
FIG. 2 illustrates an example of a wireless communication system that supports use of a high pathloss mode, in accordance with one or more aspects of the present disclosure.

FIG. 2 illustrates an example of a wireless communication system 200 that supports use of a high pathloss mode, in accordance with one or more aspects of the present disclosure. In some examples, wireless communication system 200 may implement aspects of wireless communication system 100. Wireless communication system 200 may include a first wireless device 205, a second wireless device 210, and the third wireless device 215, each of which may be examples of the base station and/or a UE as described herein. In some aspects, wireless communication system 200 may be a mmW wireless network. In some aspects, one or more of the first wireless device 205, the second wireless device 210, and/or the third wireless device 215 may be examples of nodes in an IAB network. In some aspects, wireless communication system 200 may be implemented over a shared or unlicensed radio frequency spectrum band.

Wireless networks rely on wireless transmissions propagated over a path between the wireless devices. The nature of the propagation path may vary due to mobility, interference, hidden nodes, blockage, and the like, such that wireless devices must overcome the pathloss to ensure continued wireless communications. Some wireless networks are configured to adjust various communication parameters in response to relatively minor changes in the propagation path. However, in some instances the pathloss value may exceed the ability of such techniques, which may result in a loss of communications between the wireless devices.

As one non-limiting example, mmW wireless networks may be considered an economically viable option, e.g., to provide backhaul services, as an alternative to wireline backhaul services (such as over fiberoptic networks). The wireless backhaul option may be helpful in developing countries with a lack of existing wireline infrastructure and/or in developed countries due to the high cost of deploying new wireline infrastructure.

However, backhaul services may have an associated high reliability requirement. This may mean that the reliability of wireless communications be maintained during all weather conditions, propagation path variations, etc. However, the nature of mmW propagation is such that the pathloss may increase significantly, e.g., 30 dB or more in certain weather conditions, such as heavy rain. As one non-limiting example, mmW wireless backhaul link distances between 1-3.5 kilometers may be deployed, with the resulting pathloss values of 120 to 132 dB at 28 GHz due to such link distances. Heavy rain in this instance may add another 30 dB, 45 dB, or more (depending on link target reliability and distance), which may result in total pathloss in the 165 to 180 dB range. Some wireless techniques, however, are not configured to support such a high pathloss. Moreover, other changes in the link budget may disrupt a mmW backhaul network. For example, a loss of a power amplifier may cause the transmission power levels to decrease to beyond a threshold value, e.g., which may change the link budget due to the absent the power amplifier. Some wireless techniques are also not configured to support such a significant disruption in the link budget. Accordingly, aspects of the described techniques provide a mechanism to maintain the link budget in a challenging environment by adopting a high pathloss mode (e.g., a second mode) for the wireless devices.

It is to be understood that the described techniques are not limited to a mmW network and/or to wireless backhaul communications. For example, aspects of the described techniques may be implemented by any wireless device (e.g., such as any base station and/or UE) operating in a wireless network (e.g., a Wi-Fi network, an LTE/LTE-A network, a NR/5G network, and the like). The wireless device may implement the described techniques in any wireless network experiencing a high pathloss value to ensure continued wireless communications over the network. The wireless device may implement the described techniques over a licensed radio frequency spectrum band and/or a shared or unlicensed radio frequency spectrum band.

The described techniques may include any of the first wireless device 205, the second wireless device 210, and/or the third wireless device 215 operating in at least two modes: a low (normal) pathloss mode (which may be referred to as a first mode) and the high mode (which may be referred to as a second mode). Broadly, any of the wireless devices of wireless communication system 200 may use any combination of the two modes simultaneously to communicate with different nodes.

For example, the first wireless device 205 may operate in a first mode (at least initially) in the wireless communication system 200 over the radio frequency spectrum band with the second wireless node 210 and/or the third wireless node 215. Upon determining that the value of the radio frequency spectrum band has satisfied (or exceeded) a threshold value, the first wireless device 205 may switch from the first mode to the second mode for wireless communications.

In some aspects, the determination to switch from the first mode to the second mode may be autonomous. For example, the first wireless device 205 may receive a signal that indicates that the value of the radio frequency spectrum band has satisfied (or exceeded) the threshold value. The first wireless device 205 may be performing wireless communications over the radio frequency spectrum band with the second wireless device 210 and/or the third wireless device 215. The wireless communications being performed may include access communications (e.g., data and/or control information) and/or backhaul communications.

The first wireless device 205 may monitor the channel performance in a periodic or real-time basis, which may include monitoring the value (e.g., the pathloss value, transmission power level, etc.) between the first wireless device 205 and a second wireless device 210 and/or the first wireless device 205 and the third wireless device 215. The first wireless device 205 may monitor the value by performing various channel measurements and/or by receiving feedback signaling from the second wireless device 210 and/or the third wireless device 215, such as a channel quality indicator (CQI) report or some other channel performance metric. In this context, the signal received by the first wireless device 205 indicating that the value has satisfied (or exceeded) the threshold value may include any signal received from the second wireless device 210 and/or the third wireless device 215 during normal wireless communications. The first wireless device 205 may monitor the transmission power levels of the first wireless device 205, the second wireless device 210, and/or the third wireless device 215 to determine whether a change in the transmission power levels (which may greatly impact the link budget) may indicate that a change in the mode is warranted. Accordingly, the first wireless device 205 may know or otherwise determine when the value has satisfied (or exceeded) the threshold value.

In some aspects, the determination to switch from the first mode to the second mode may be based on an indication received from the second wireless device 210 and/or the third wireless device 215. For example, the second wireless device 210 (in the example illustrated in wireless communication system 200) may transmit a signal to the first wireless device 205 that carries or otherwise conveys an indication that the value of the radio frequency spectrum band has satisfied (or exceeded) the threshold value. That is, the signal may carry one or more bits, fields, and the like, that explicitly indicate the value, that the second wireless device 210 has switched from the first mode to the second mode, and/or some other implicit indication that the value as satisfied (or exceeded) the threshold value. In some aspects, the signal indicating that the value has satisfied (or exceeded) the threshold value may be in-band signaling, out-of-band signaling, broadcast signal, a unicast signal, and the like.

One example of switching from the first mode to the second mode may be based on an anticipation of a change in the weather conditions. For example, the first wireless device 205, second wireless device 210, and/or the third wireless device 215 may monitor weather conditions (current and/or forecasted) and determine that the weather conditions have (or will likely) degrade channel performance/link budget such that the value satisfies (or exceeds) the threshold value. Based on the anticipated rise in the value, the wireless device may determine or otherwise decide to switch from the first mode to the second mode. Accordingly, the wireless device may, based on the change in the mode, transmit a signal to the other wireless devices indicating that it intends to switch from the first mode to the second mode. The signal may be transmitted in a unicast manner to a particular wireless device (e.g., from the second wireless device 210 to the first wireless device 205, or vice versa), or may be broadcast so that the other wireless devices can all be notified of the switch.

In one example, the determination of whether to transmit the signal indicating that the value has satisfied (or exceeded) the threshold value using in-band or out-of-band signaling may be based on various factors, e.g., such as the congestion level for a particular radio frequency spectrum band, the resource cost associated with communicating over a particular radio frequency spectrum band, the link status between the wireless devices over a particular radio frequency spectrum band, and the like. For example, the wireless devices of wireless communication system 200 may be performing wireless communications in a first radio frequency spectrum band (e.g., a mmW radio frequency spectrum band), but may utilize a second radio frequency spectrum band (e.g., a sub-6 GHz radio frequency spectrum band) to transmit the signal to other wireless devices of its intention to switch to the second mode.

In one example, this may be due to a link failure in the first radio frequency spectrum band associated with a high value. For example, the value for the first radio frequency spectrum band may suddenly exceed a value supportable by the first mode, which may result in link failure over the first radio frequency spectrum band. Accordingly, the wireless device may switch from the first mode to the second mode over the first radio frequency spectrum band and transmit a signal to other wireless devices over the second radio frequency spectrum band to signal or otherwise indicate the intent to switch to the second mode in the first radio frequency spectrum band. In some aspects, the wireless device may set a priority level for the signal indicating its intent to switch to the second mode to a high-level to ensure receipt by the other wireless devices.

Accordingly, the first wireless device 205 and/or the second wireless device 210 may determine to switch from the first mode to the second mode, e.g., from the normal or low pathloss mode to the high pathloss mode. Broadly, the second mode may include various parameters (alone or in any combination) that support continued wireless communications being performed over the radio frequency spectrum band experiencing a value that has satisfied (or exceeded) the threshold pathloss value.

Examples of such an parameters include, but are not limited to, an MCS, a HARQ, SSB, CSI-RS, demodulation reference signal (DMRS), an aggregation level, bandwidth, beam width (or beam selection), and the like. For example, the length of the SSB (e.g., the amount of time/frequency resources allocated to SSB transmissions) in the first mode may be shorter than the length of the SSB in the second mode. In some examples, the length of the SSB in the second mode may be increased by a factor of 2, 5, 10, etc., over the length of the SSB in the first mode. Similarly, the length of various reference signals (e.g., CSI-RS, DMRS, and the like) may be shorter in the first mode than in the second mode (e.g., by a factor of 2, 5, 10, etc.).

Another example of such parameters may include the MCS utilized in the first mode being higher than the MCS utilized in the second mode. For example, each mode may be associated with a set of available MCSs, with each MCS corresponding to a combination of a coding rate and a modulation scheme. In some aspects, each MCS scheme in the set of the first mode may be higher than each MCS scheme in the set of the second mode. In this context, "higher" may mean that the coding rate is larger, e.g., one half as opposed to one quarter, and the modulation constellation is larger, e.g., 64 quadrature amplitude modulation (QAM) as opposed to quadratic phase-shift keying (QPSK).

Another example of such parameters may include the bandwidth utilized in the first mode being wider than the bandwidth utilized in the second mode. That is, the second mode may utilize a more narrow bandwidth to improve wireless communications over the radio frequency spectrum band. In some aspects, selection of the particular channel for the second mode may be based on the performance of that channel in comparison to the other channels utilized in the wider bandwidth of the first mode. In some aspects, the operating bandwidth utilized in the second mode for SSB, random access channel (RACH) signals, and the like, may be more narrow than the bandwidth utilized in the first mode.

Another example of such parameters may include the beam width of the first mode being more narrow than the beam width utilized with the second mode. For example, the second mode may utilize a more narrow beam width (e.g., a P3 beam as opposed to a P2 beam, or a P2 beam as opposed to P1 beam) to improve directionality when communicating in the second mode. However, in another example the beam width of the second mode may be wider than the beam width used in the first pathloss mode. For example, the wireless device may determine that the narrow beam width is experiencing the high pathloss (e.g., due to mobility, blockage, and the like), and switch to a wider beam width for communications while operating in the second mode. While the wider beam width may have less directionality, the associated coverage area may improve detection by the other wireless device.

Another example of such parameters may include an aggregation level utilized in the first mode being lower than the aggregation level utilized in the second mode. For example, the aggregation level utilized in the second mode may be increased by a factor of 2, 5, 10, and the like, over the aggregation level utilized in the first mode.

In some aspects, such system parameters may be based on the type of information being communicated. For example and for data channels (e.g., physical downlink shared channel (PDSCH), physical uplink shared channel (PUSCH), etc.), the MCS and HARQ operation of the data channel may be selected to be much more conservative, such as by introducing one or more high pathloss MCS s that are potentially coupled with corresponding HARQ parameters. This may allow the data channels to overcome the high pathloss when operating in the second mode. As another example and for control channels (e.g., physical downlink control channel (PDCCH), physical uplink control channel (PUCCH), etc.), the SSB, CSI-RS, and the like, of the second mode may be ten times longer, for example, than that of the first mode. The DMRS of the control channel and the data channels may be 10 times longer, for example, in the time domain in the second mode than in the first mode. Similarly, the PDCCH may have an aggregation level in the second mode representing, in effect, ten times lower MCS, for example, than that of the first mode. As discussed, the operating bandwidth of the SSB, RACH, etc., in the second mode can be much more narrow than the first mode.

Accordingly, the first wireless device 205 and the second wireless device 210 may switch from the first mode to the second mode to continue wireless communications over the radio frequency spectrum band. As discussed, the wireless devices of wireless communication system 200 may be configured to operate simultaneously in both the first mode and the second mode with separate wireless devices. As illustrated, the first wireless device 205 may operate in the second mode with respect to the second wireless device 210, but may operate in the first mode with respect to the third wireless device 215.

In some aspects, the wireless devices of wireless communication system 200 may utilize aspects of the described techniques to switch back to the first mode, e.g., such as when the value falls below the threshold value.

Figure 3:
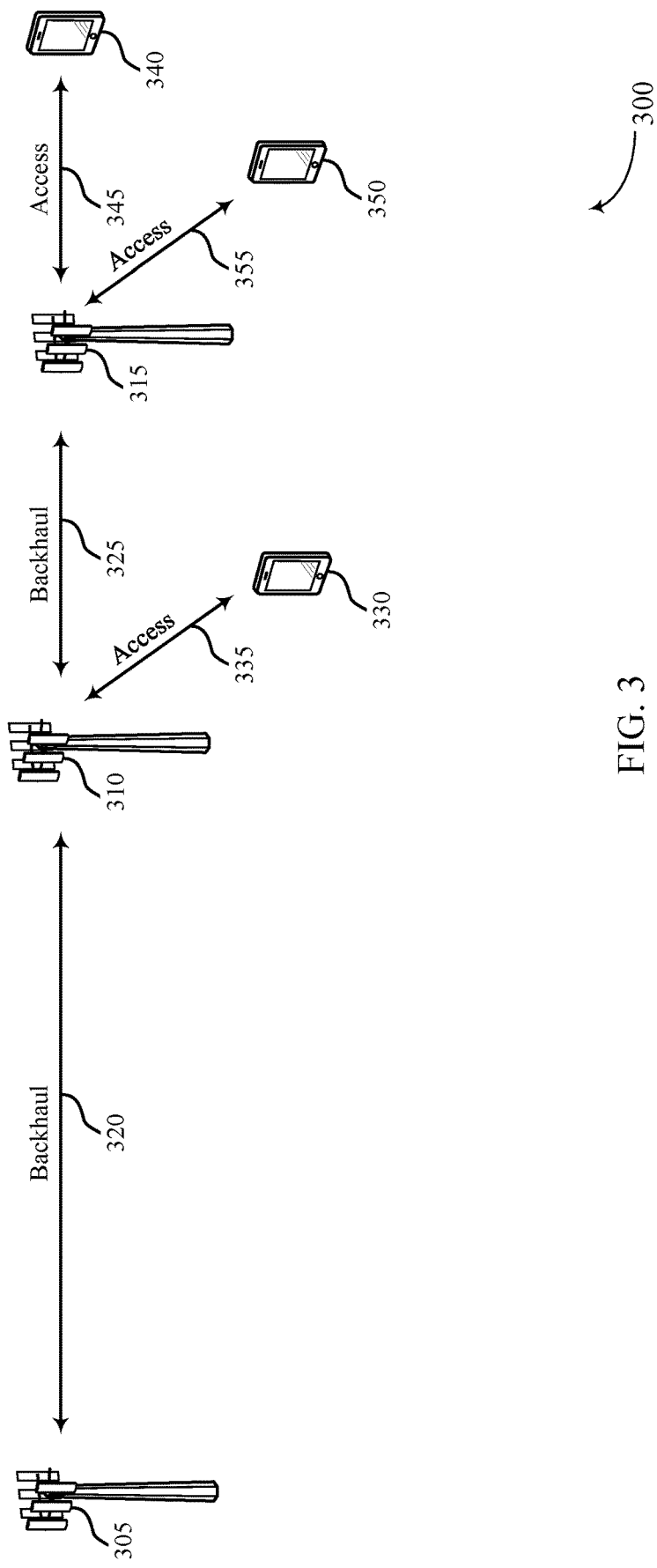
FIG. 3 illustrates an example of a wireless communication system that supports use of a high pathloss mode, in accordance with one or more aspects of the present disclosure.

FIG. 3 illustrates an example of a wireless communication system 300 that supports use of a high pathloss mode, in accordance with one or more aspects of the present disclosure. In some examples, wireless communication system 300 may implement aspects of wireless communication systems 100 and/or 200. Wireless communication system 300 may include base stations 305, 310, and 315, and UEs 330, 340, and 350, which may be examples of corresponding devices described herein. In some aspects, wireless communication system 300 may operate over a mmW radio frequency spectrum band. In some aspects, any of the base stations 305, 310, 315 and/or UEs 330, 340, 350, may be examples of a wireless device as described herein. In some aspects, any of the base stations 305, 310, 315 and/or UEs 330, 340, 350, may implement aspects of the described techniques over a licensed radio frequency spectrum band and/or a shared or unlicensed radio frequency spectrum band.

In some aspects, wireless communication system 300 may be an example of an IAB network. For example, base stations 305, 310, and 315 may be nodes within an IAB network. Accordingly, base station 305 may communicate over backhaul links 320 with base station 310, and vice versa. Base station 310 may communicate with base station 315 over backhaul link 325 and/or with UE 330 over access link 335, or vice versa. Base station 315 may communicate with UE 340 over access link 345 and/or with UE 350 over access link 355, or vice versa. In some aspects, one or more of backhaul links 320 and/or 325 may operate over a mmW radio frequency spectrum band. In this example, base station 305, 310, and/or 315, may also have an additional link (not shown), such as a sub-6 GHz radio frequency spectrum band link.

As discussed, aspects of the described techniques enable support for wireless communications over a radio frequency spectrum band in a high pathloss/low transmission power level environment by utilizing a second mode (e.g., a high pathloss mode). The second mode may utilize various parameters (e.g., MCS, HARQ, aggregation level, reference signals, etc.) that are configured or otherwise selected to support wireless communications over the radio frequency spectrum band experiencing a value that satisfies (or exceeds) a threshold value.

Initially, any of the wireless devices of wireless communication system 300 may operate according to a first mode (e.g., the low pathloss mode or normal mode) over the radio frequency spectrum band. The wireless devices may receive a signal that carries or otherwise conveys an indication that the value of the radio frequency spectrum band has satisfied (or exceeded) a threshold value.

In one example, the wireless device may receive the signal and autonomously determine that the value has satisfied (or exceeded) the threshold pathloss value and, therefore, to switch from the first mode to the second mode. In this context, the signal may refer to any signal being communicated between the wireless devices of wireless communication system 300. That is, the wireless device may monitor the channel performance of the radio frequency spectrum band for ongoing communications between itself and other wireless devices. In one example, this may include the wireless device receiving signals carrying or otherwise conveying an indication of channel performance feedback information (e.g., CQI information, transmission power level, or some other channel performance metric). In another example, this may include the wireless device monitoring the received power level for signals being communicated between the wireless devices. When the receive power level of one or more signals exchanged during ongoing communications is at or below a threshold level, this may indicate that the pathloss value has satisfied (or exceeded) a threshold pathloss value.

In some aspects, the signal indicating that the value has satisfied (or exceeded) the threshold value may be a signal from the other wireless device indicating that the value has satisfied the threshold value and/or that the other wireless device is switching from the first mode to the second mode. The signal may be received using in-band signaling, out-of-band signaling, unicast signaling, broadcast signaling, and the like.

Based on the signal being received that indicates that the value of the radio frequency spectrum band has satisfied (or exceeded) the threshold value, the wireless device may switch from the first mode to the second mode for wireless communications over the radio frequency spectrum band. In some aspects, the wireless device may also transmit its own signal to other wireless devices (e.g., upstream wireless devices and/or downstream wireless devices) indicating its intent to switch from the first mode to the second mode.

As discussed, various parameters utilized during wireless communications may be different between the first mode and the second mode. For example, the SSB of the first mode may be shorter (e.g., in time and/or frequency resources) than the SSB in the second mode. Additionally or alternatively, the reference signal (e.g., CSI-RS, DMRS, etc.) of the first mode may be shorter (e.g., again in time and/or frequency resources) than the reference signal of the second mode. Additionally or alternatively, the MCS of the first mode may be higher than the MCS of the second mode. Additionally or alternatively, the bandwidth of the first mode a be wider than the bandwidth of the second mode. Additionally or alternatively, the beam width of the first mode may be narrower (or wider in some instances) than the beam width of the second mode.

Accordingly, the wireless devices of wireless communication system 300 that switch to the second mode may continue to perform wireless communications over the radio frequency spectrum band in the high pathloss environment. As discussed, the wireless device may simultaneously perform wireless communications according to the first mode with other wireless devices. For example, base stations 305 and 310 may perform wireless communications according to the second mode over backhaul link 320, where base stations 310 and 315 may perform wireless communications according to the first mode over backhaul links 325. Base stations 310 and/or 315 may perform wireless communications with UEs 330, 340, and/or 350, over access links 335, 345, and/or 355, respectively, according to the first mode or the second mode (e.g., depending on the pathloss value/transmission power level for each respective link).

Figure 4:
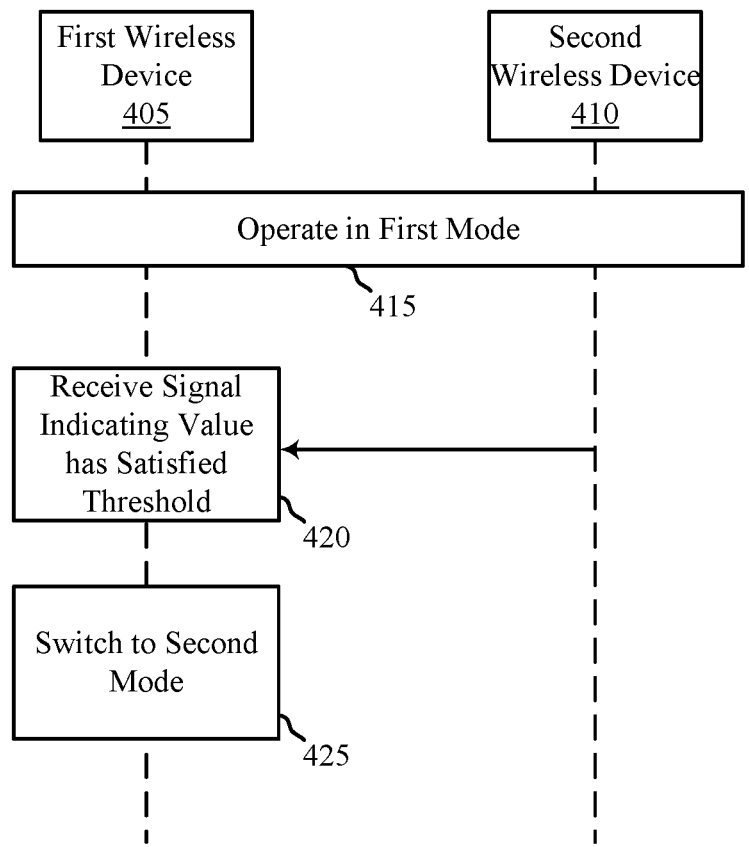
FIG. 4 illustrates an example of a process that supports use of a high pathloss mode, in accordance with one or more aspects of the present disclosure.

FIG. 4 illustrates an example of a process 400 that supports use of a high pathloss mode, in accordance with one or more aspects of the present disclosure. In some examples, process 400 may implement aspects of wireless communication systems 100, 200, and/or 300. Aspects of process 400 may be implemented by a first wireless device 405 and/or a second wireless device 410, which may be examples of a base station and/or a UE as described herein. Aspects of process 400 may be implemented over a wireless network, such as a mmW radio frequency spectrum band. Aspects of process 400 may be implemented over an IAB network. Aspects of process 400 may be implemented over a licensed radio frequency spectrum band and/or a shared or unlicensed radio frequency spectrum band.

At 415, the first wireless device 405 and the second wireless device 410 may be operating (e.g., performing ongoing wireless communications) in a first mode in a wireless network over a radio frequency spectrum band. The first mode may have an associated first SSB having a first SSB length (in time and/or frequency resources), an associated first reference signal having a first reference signal length, an associated first MCS, an associated first bandwidth, an associated first beam width, and the like.

At 420, the first wireless device 405 may receive (and the second wireless device 410 may transmit) a signal that carries or otherwise conveys an indication that a value of the radio frequency spectrum band has satisfied (or exceeded) a threshold value.

In some aspects, the signal may be any signal exchanged during ongoing communications between the first wireless device 405 and the second wireless device 410 (e.g., in the uplink, downlink, backhaul, access, and the like, signal). Accordingly, the first wireless device 405 may measure the received power level of the signal and determine that the receive power level is at or below a threshold level. The receive power level being at or below the threshold level may provide the indication that the pathloss value has satisfied (or exceeded) the threshold pathloss value.

In some aspects, the signal may explicitly and/or implicitly convey an indication that the value has satisfied (or exceeded) the threshold value. For example, the signal may indicate the value explicitly and/or may indicate that the second wireless device 410 is switching to operate according to the second mode. In another example, the signal may carry or convey an indication of a channel performance feedback (e.g., a CQI), which indicates that the value of the radio frequency spectrum band has satisfied (or exceeded) the threshold value.

In some aspects, the signal may be transmitted using in-band signaling (e.g., the same radio frequency spectrum band as is being used for ongoing wireless communications between the first wireless device 405 and the second wireless device 410). In some aspects, the signal may be transmitted using out-of-band signaling (e.g., using a different radio frequency spectrum band than is being used for ongoing wireless communications between the first wireless device 405 and the second wireless device 410). In some aspects, the signal may be a unicast signal (e.g., a signal transmitted in a unicast transmission from the second wireless device 410 to the first wireless device 405). In some aspects, the signal may be a broadcast signal (e.g., a signal transmitted in a broadcast transmission from the second wireless device 410 to any other wireless device communicating over the radio frequency spectrum band).

At 425, the first wireless device 405 may switch, based at least in part on the signal indicating that the value has satisfied (or exceeded) the threshold value, from the first mode to the second mode for wireless communications in the wireless network. In some aspects, the length of the first SSB associated with the first mode may be shorter (e.g., in time and/or frequency resources) than the length of a second SSB associated with the second mode. Additionally or alternatively, the length of the first reference signal associated with the first mode may be shorter (again in time and/or frequency resources) than the length of the second reference signal associated with the second mode. Additionally or alternatively, the MCS of the first mode may be higher than the MCS of the second mode. Other system parameters may be selected in order to support ongoing communications between the first wireless device 405 and the second wireless device 410 in the second mode.

It is to be understood that the second wireless device 410 may also switch from the first mode to the second mode. For example, the second wireless device 410 may receive a signal (not shown) from the first wireless device 405 that indicates (explicitly and/or implicitly) that the value of the radio frequency spectrum band has satisfied (or exceeded) the threshold value. The second wireless device 410 may switch to the second mode based at least in part on the signal. Accordingly, the first wireless device 405 and the second wireless device 410 may continue to perform wireless communications in the wireless network over the radio frequency spectrum band according to the second mode.

It is also to be understood that the first wireless device 405 and/or the second wireless device 410 may also switch back to the first mode from the second mode. For example, the first wireless device 405 and/or the second wireless device 410 may continue to monitor the channel performance of the radio frequency spectrum band and determine that the value has fallen below the threshold value. Accordingly, either or both devices may switch back to the first mode based on this determination. Either or both wireless devices may also transmit a signal to other wireless devices indicating its intent to switch back to the first mode and/or indicating that the value has fallen below (or fails to satisfy) the threshold value.

Figure 5:
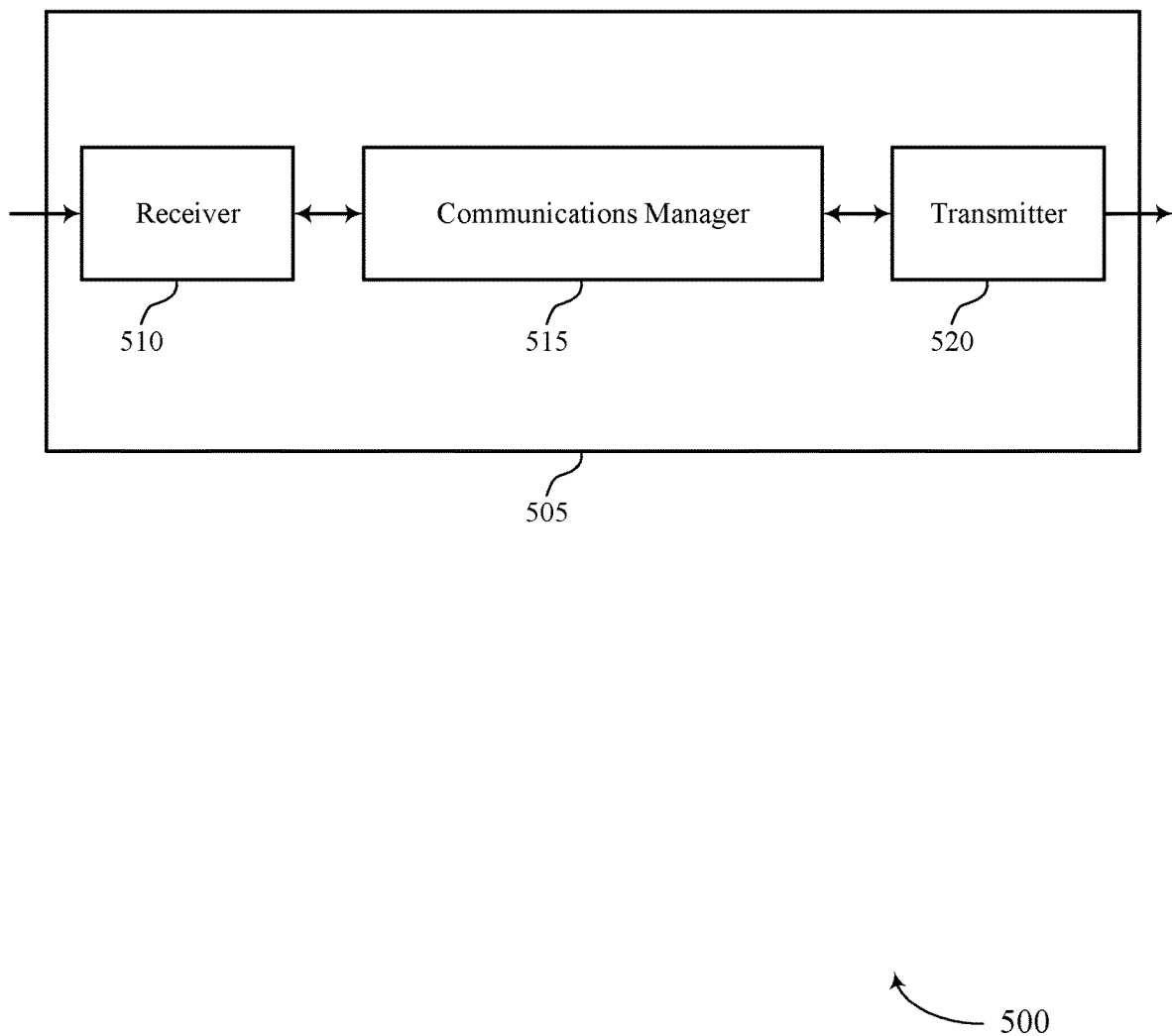
FIGS. 5 and 6 show block diagrams of devices that support the use of a high pathloss mode, in accordance with one or more aspects of the present disclosure.

FIG. 5 shows a block diagram 500 of a device 505 that supports use of a high pathloss mode, in accordance with one or more aspects of the present disclosure.

The device 505 may be an example of aspects of a UE 115, a wireless device, or base station 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to support of high pathloss mode, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may operate in a first mode in a wireless network over a radio frequency spectrum band, receive a signal indicating that a value of the radio frequency spectrum band has satisfied a threshold value, and switch, based on the signal indicating that the value has satisfied the threshold value, from the first mode to a second mode for wireless communications in the wireless network, where a first length of a first SSB associated with the first mode is shorter than a second length of a second SSB associated with the second mode. The communications manager 515 may be an example of aspects of the communications manager 810 or the communications manager 910 as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

Figure 6:
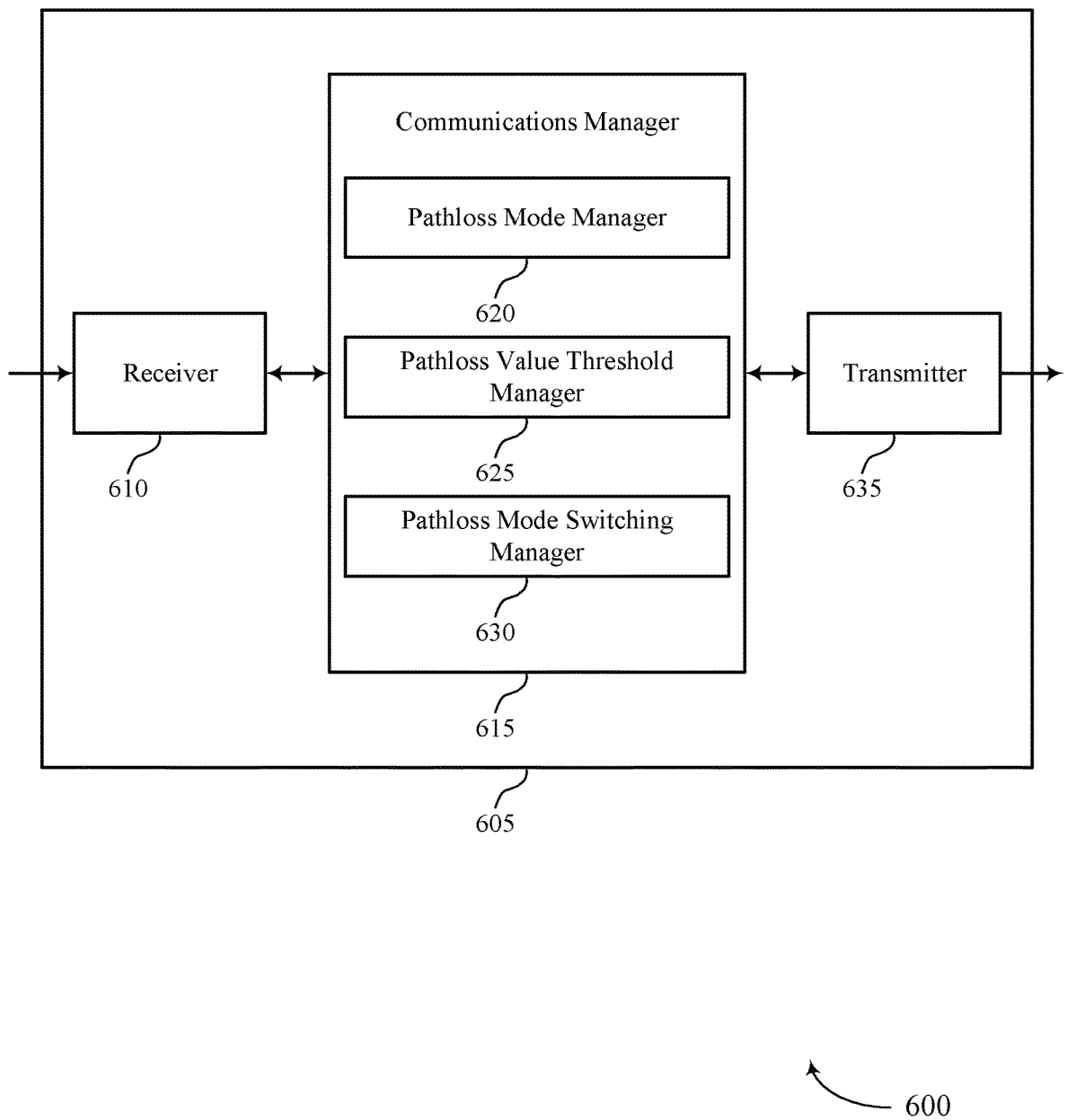

FIG. 6 shows a block diagram 600 of a device 605 that supports use of a high pathloss mode, in accordance with one or more aspects of the present disclosure. The device 605 may be an example of aspects of a device 505, a wireless device, a UE 115, or a base station 105 as described herein. The device 605 may include a receiver 610, a communications manager 615, and a transmitter 635. The device 605 may also include a processor. Each of these components may be in communication with one another (e.g., via one or more buses).

Receiver 610 may receive information such as packets, user data, or control information associated with various information channels (e.g., control channels, data channels, and information related to support of high pathloss mode, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a pathloss mode manager 620, a pathloss value threshold manager 625, and a pathloss mode switching manager 630. The communications manager 615 may be an example of aspects of the communications manager 810 or the communications manager 910 as described herein.

The pathloss mode manager 620 may operate in a first mode in a wireless network over a radio frequency spectrum band.

The pathloss value threshold manager 625 may receive a signal indicating that a value of the radio frequency spectrum band has satisfied a threshold value.

The pathloss mode switching manager 630 may switch, based on the signal indicating that the value has satisfied the threshold value, from the first mode to a second mode for wireless communications in the wireless network, where a first length of a first SSB associated with the first mode is shorter than a second length of a second SSB associated with the second mode.

Transmitter 635 may transmit signals generated by other components of the device 605. In some examples, the transmitter 635 may be collocated with a receiver 610 in a transceiver module. For example, the transmitter 635 may be an example of aspects of the transceiver 820 or 920 as described with reference to FIGS. 8 and 9. The transmitter 635 may utilize a single antenna or a set of antennas.

Figure 7:
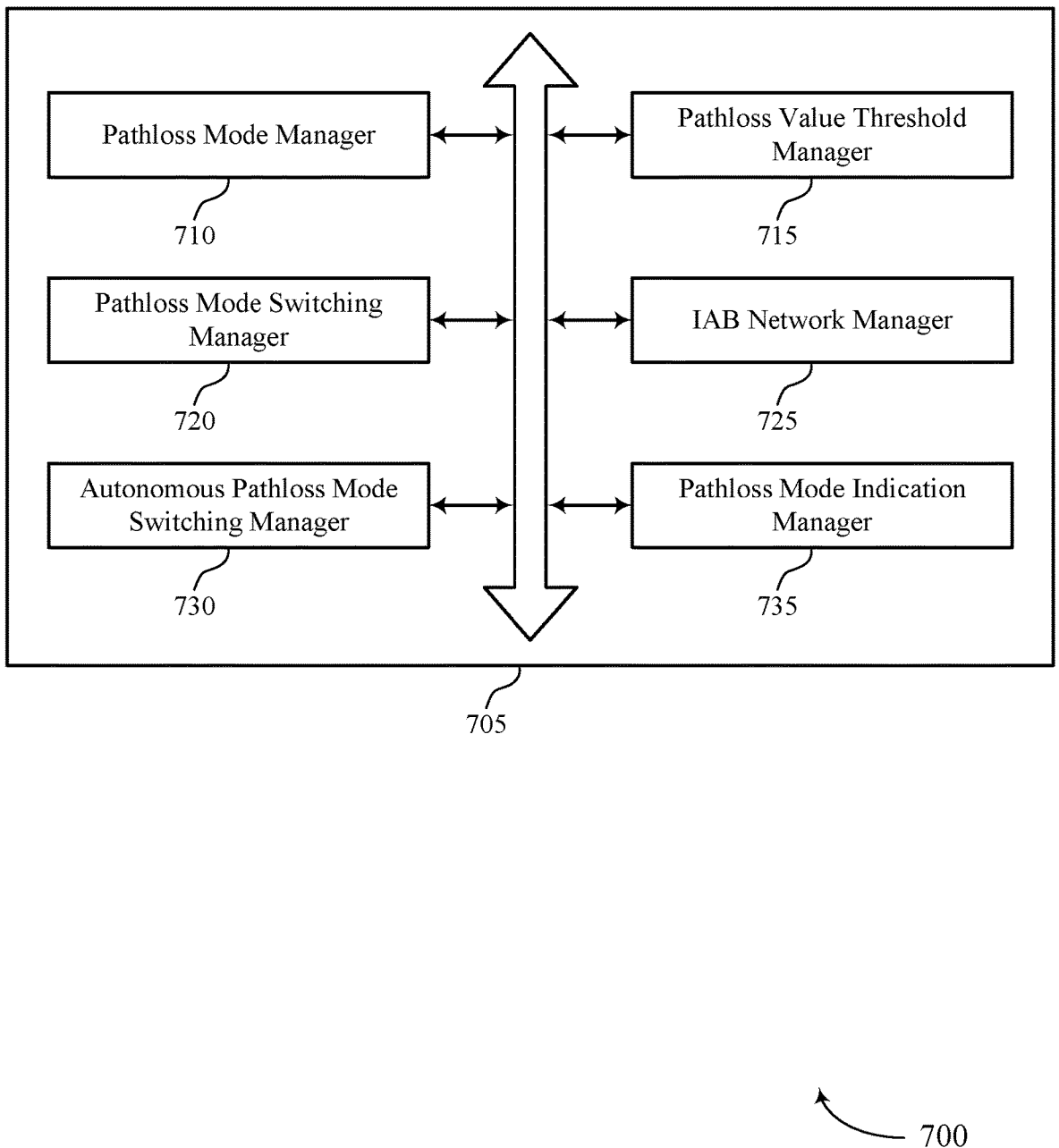
FIG. 7 shows a block diagram of a communications manager that supports use of a high pathloss mode, in accordance with one or more aspects of the present disclosure.

FIG. 7 shows a block diagram 700 of a communications manager 705 that supports use of a high pathloss mode, in accordance with one or more aspects of the present disclosure. The communications manager 705 may be an example of aspects of a communications manager 515, a communications manager 615, or a communications manager 810 described herein. The communications manager 705 may include a pathloss mode manager 710, a pathloss value threshold manager 715, a pathloss mode switching manager 720, an IAB network manager 725, an autonomous pathloss mode switching manager 730, and a pathloss mode indication manager 735. Each of these modules may communicate, directly or indirectly, with one another (e.g., via one or more buses).

The pathloss mode manager 710 may operate in a first mode in a wireless network over a radio frequency spectrum band.

The pathloss value threshold manager 715 may receive a signal indicating that a value of the radio frequency spectrum band has satisfied a threshold value. In some cases, the signal includes at least one of an in-band signal, an out-of-band signal, a broadcast signal, a unicast signal, or a combination thereof.

The pathloss mode switching manager 720 may switch, based on the signal indicating that the value has satisfied the threshold value, from the first mode to a second mode for wireless communications in the wireless network, where a first length of a first SSB associated with the first mode is shorter than a second length of a second SSB associated with the second mode. In some cases, a first length of a first reference signal associated with the first mode is shorter than a second length of a second reference signal associated with the second mode. In some cases, a first MCS associated with the first mode is higher than a second MCS associated with the second mode. In some cases, a first bandwidth associated with the first mode is wider than a second bandwidth associated with the second mode. In some cases, a first beam width associated with the first mode is narrower than a second beam width associated with the second mode.

The IAB network manager 725 may perform wireless backhaul communications with a second wireless device of the IAB network according to the second mode. In some examples, the IAB network manager 725 may perform wireless backhaul communications with a third wireless device of the IAB network according to the first mode or the second mode. In some cases, the wireless network includes an IAB network.

In some cases, the value comprises a pathloss value and the threshold value comprises a threshold pathloss value. The autonomous pathloss mode switching manager 730 may determine that the signal was received at a received power level below a threshold level, where the signal being received at the received power level below the threshold level indicates that the pathloss value has surpassed the threshold pathloss value.

The pathloss mode indication manager 735 may transmit an indication to one or more other wireless devices that the wireless device has switched to the second mode. In some examples, the pathloss mode indication manager 735 may decode the signal to determine that the value has surpassed the threshold value.

Figure 8:
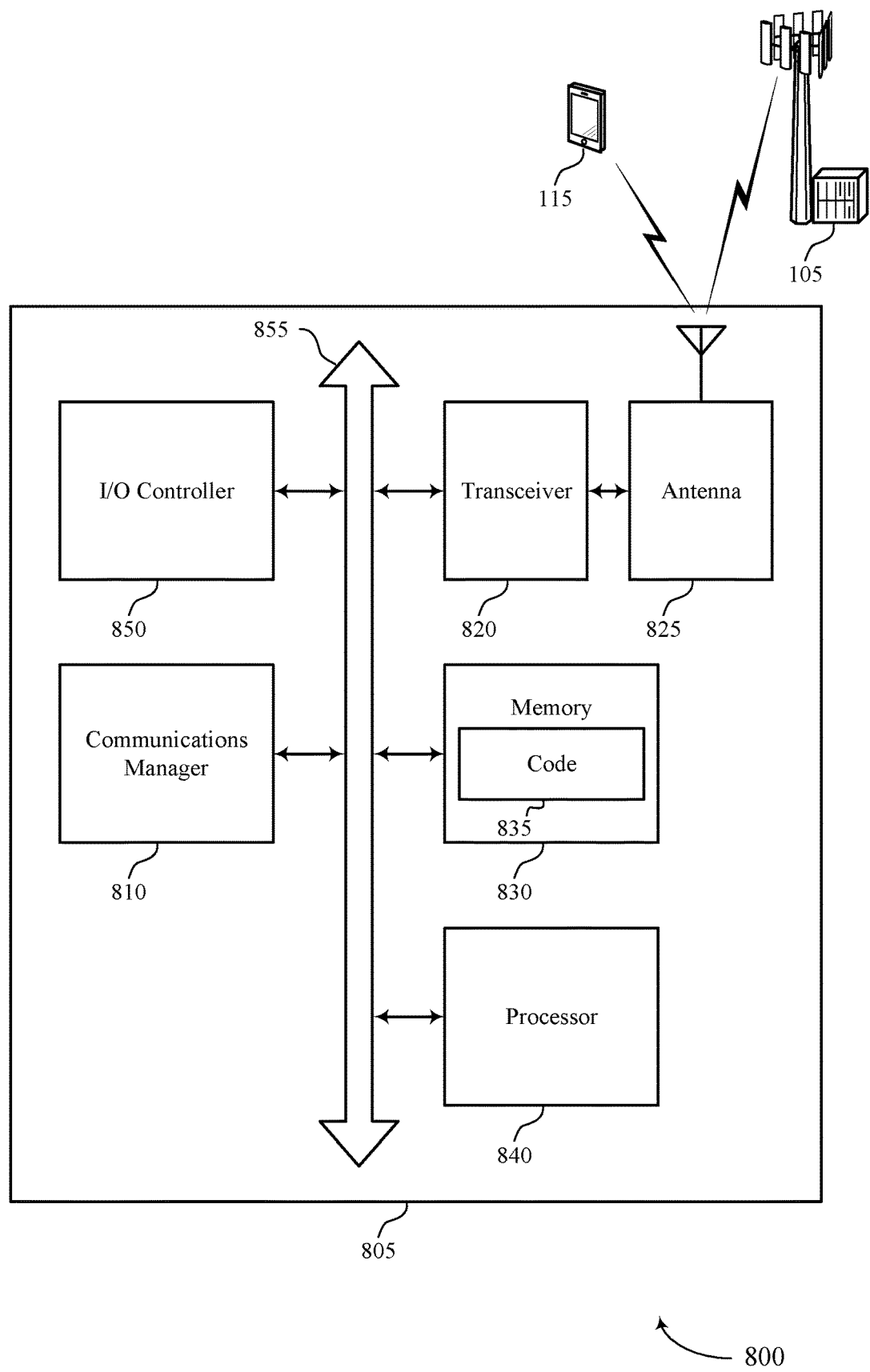
FIG. 8 shows a diagram of a system including a UE that supports use of a high pathloss mode, in accordance with one or more aspects of the present disclosure.

FIG. 8 shows a diagram of a system 800 including a device 805 that supports use of a high pathloss mode, in accordance with one or more aspects of the present disclosure. The device 805 may be an example of or include the components of device 505, a wireless device, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may operate in a first mode in a wireless network over a radio frequency spectrum band, receive a signal indicating that a value of the radio frequency spectrum band has satisfied a threshold value, and switch, based on the signal indicating that the value has satisfied the threshold value, from the first mode to a second mode for wireless communications in the wireless network, where a first length of a first SSB associated with the first mode is shorter than a second length of a second SSB associated with the second mode.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM), read-only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting support of high pathloss mode).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
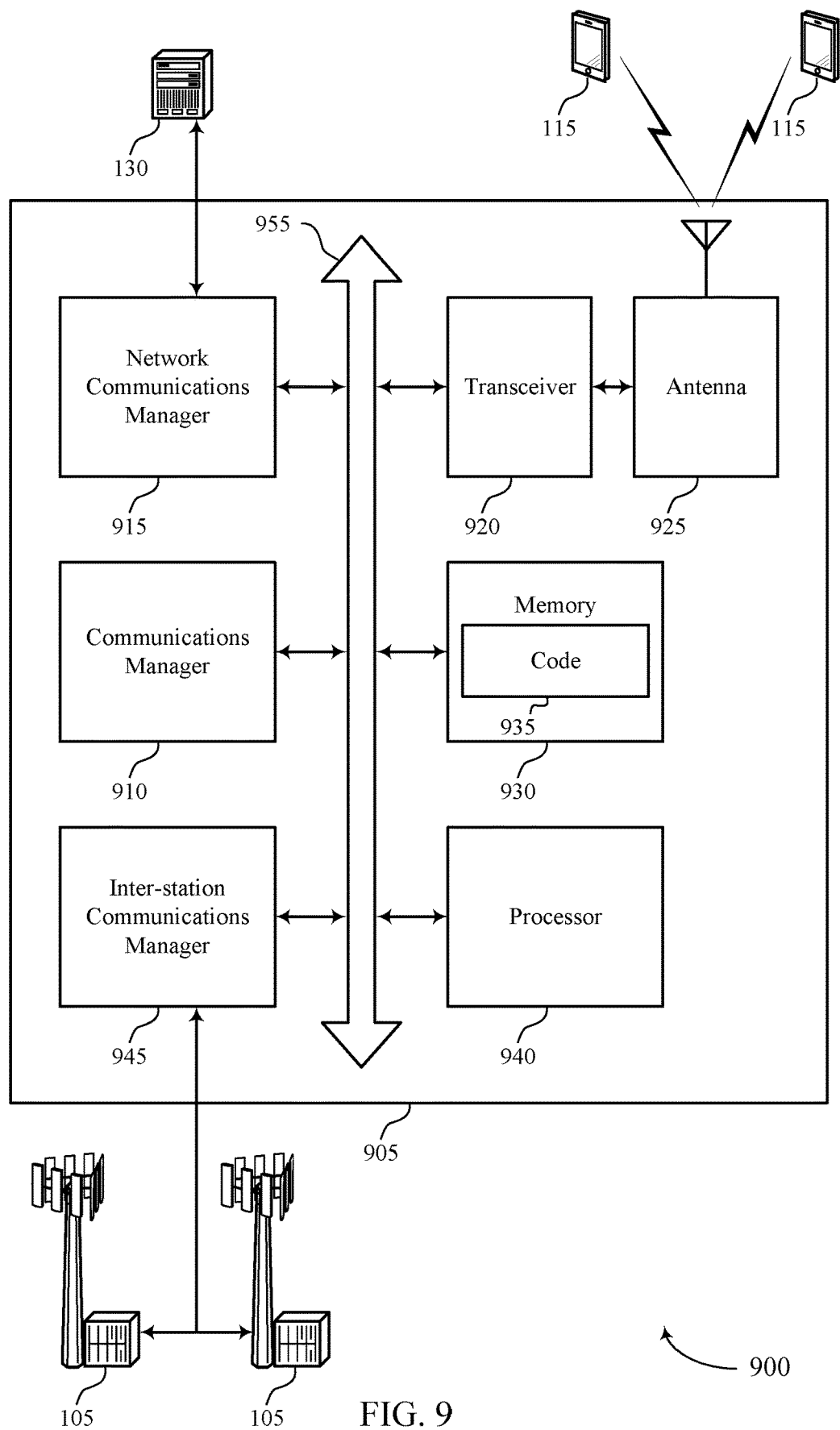
FIG. 9 shows a diagram of a system including a base station that supports use of a high pathloss mode, in accordance with one or more aspects of the present disclosure.

FIG. 9 shows a diagram of a system 900 including a device 905 that supports use of a high pathloss mode, in accordance with one or more aspects of the present disclosure. The device 905 may be an example of or include the components of device 505, a wireless device, device 605, or a base station 105 as described herein. The device 905 may include components for bi-directional voice and data communications including components for transmitting and receiving communications, including a base station (BS) communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may operate in a first mode in a wireless network over a radio frequency spectrum band, receive a signal indicating that a value of the radio frequency spectrum band has satisfied a threshold value, and switch, based on the signal indicating that the value has satisfied the threshold value, from the first mode to a second mode for wireless communications in the wireless network, where a first length of a first SSB associated with the first mode is shorter than a second length of a second SSB associated with the second mode.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting support of high pathloss mode).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
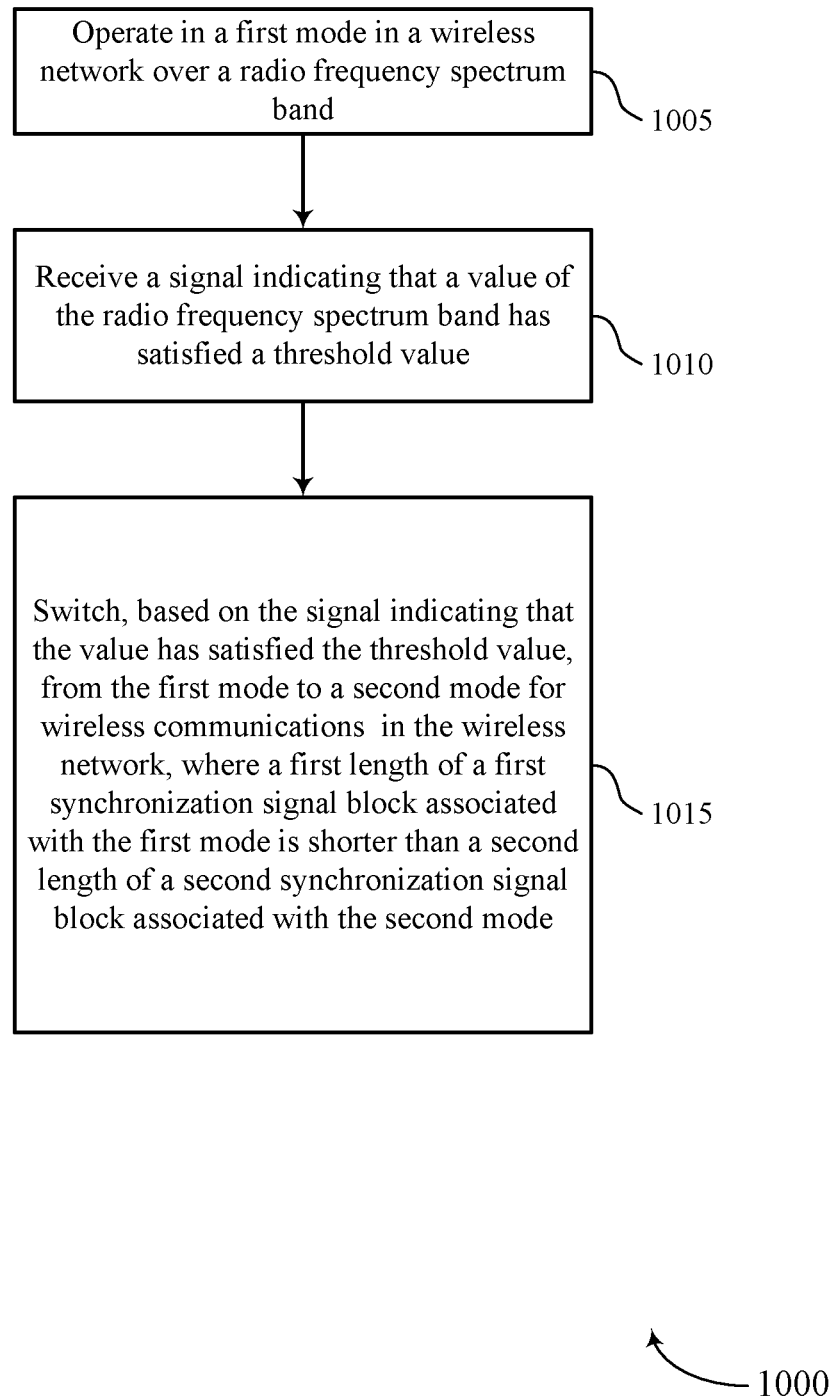
FIGS. 10 through 12 show flowcharts illustrating methods that support the use of a high pathloss mode, in accordance with one or more aspects of the present disclosure.

FIG. 10 shows a flowchart illustrating a method 1000 that supports use of a high pathloss mode, in accordance with one or more aspects of the present disclosure. The operations of method 1000 may be implemented by a UE 115 or base station 105 (e.g., a wireless device) or its components as described herein. For example, the operations of method 1000 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1005, the UE or base station may operate in a first mode in a wireless network over a radio frequency spectrum band. The operations of 1005 may be performed according to the methods described herein. In some examples, aspects of the operations of 1005 may be performed by a pathloss mode manager as described with reference to FIGS. 5 through 9.

At 1010, the UE or base station may receive a signal indicating that a value of the radio frequency spectrum band has satisfied a threshold value. The operations of 1010 may be performed according to the methods described herein. In some examples, aspects of the operations of 1010 may be performed by a pathloss value threshold manager as described with reference to FIGS. 5 through 9.

At 1015, the UE or base station may switch, based on the signal indicating that the value has satisfied the threshold value, from the first mode to a second mode for wireless communications in the wireless network, where a first length of a first SSB associated with the first mode is shorter than a second length of a second SSB associated with the second mode. The operations of 1015 may be performed according to the methods described herein. In some examples, aspects of the operations of 1015 may be performed by a pathloss mode switching manager as described with reference to FIGS. 5 through 9.

Figure 11:
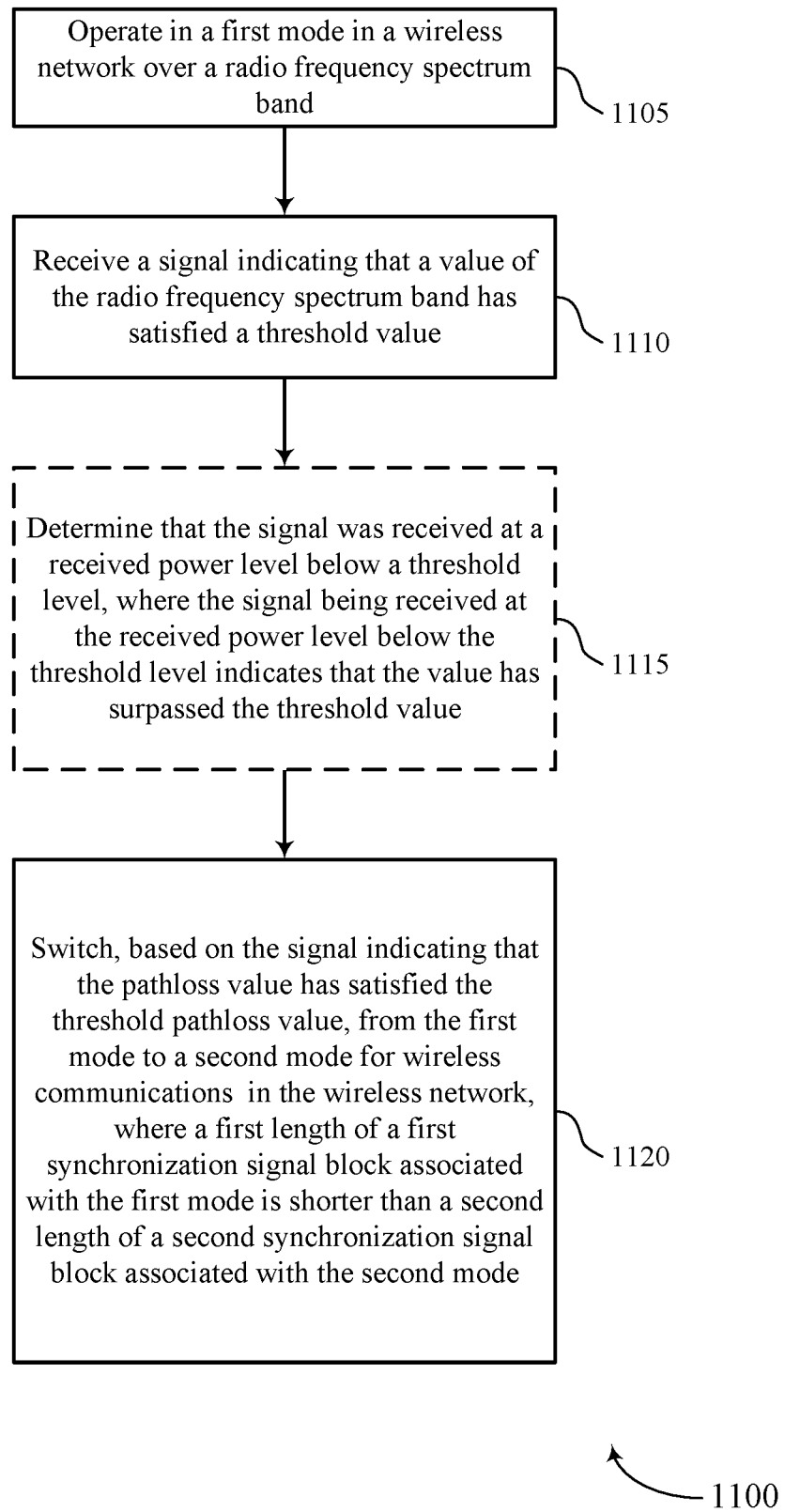

FIG. 11 shows a flowchart illustrating a method 1100 that supports use of a high pathloss mode, in accordance with one or more aspects of the present disclosure. The operations of method 1100 may be implemented by a UE 115 or base station 105 (e.g., a wireless device) or its components as described herein. For example, the operations of method 1100 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may operate in a first mode in a wireless network over a radio frequency spectrum band. The operations of 1105 may be performed according to the methods described herein. In some examples, aspects of the operations of 1105 may be performed by a pathloss mode manager as described with reference to FIGS. 5 through 9.

At 1110, the UE or base station may receive a signal indicating that a value of the radio frequency spectrum band has satisfied a threshold value. The operations of 1110 may be performed according to the methods described herein. In some examples, aspects of the operations of 1110 may be performed by a pathloss value threshold manager as described with reference to FIGS. 5 through 9.

At 1115, the UE or base station may determine that the signal was received at a received power level below a threshold level, where the signal being received at the received power level below the threshold level indicates that the value has surpassed the threshold value. The operations of 1115 may be performed according to the methods described herein. In some examples, aspects of the operations of 1115 may be performed by an autonomous pathloss mode switching manager as described with reference to FIGS. 5 through 9.

At 1120, the UE or base station may switch, based on the signal indicating that the value has satisfied the threshold value, from the first mode to a second mode for wireless communications in the wireless network, where a first length of a first SSB associated with the first mode is shorter than a second length of a second SSB associated with the second mode. The operations of 1120 may be performed according to the methods described herein. In some examples, aspects of the operations of 1120 may be performed by a pathloss mode switching manager as described with reference to FIGS. 5 through 9.

Figure 12:
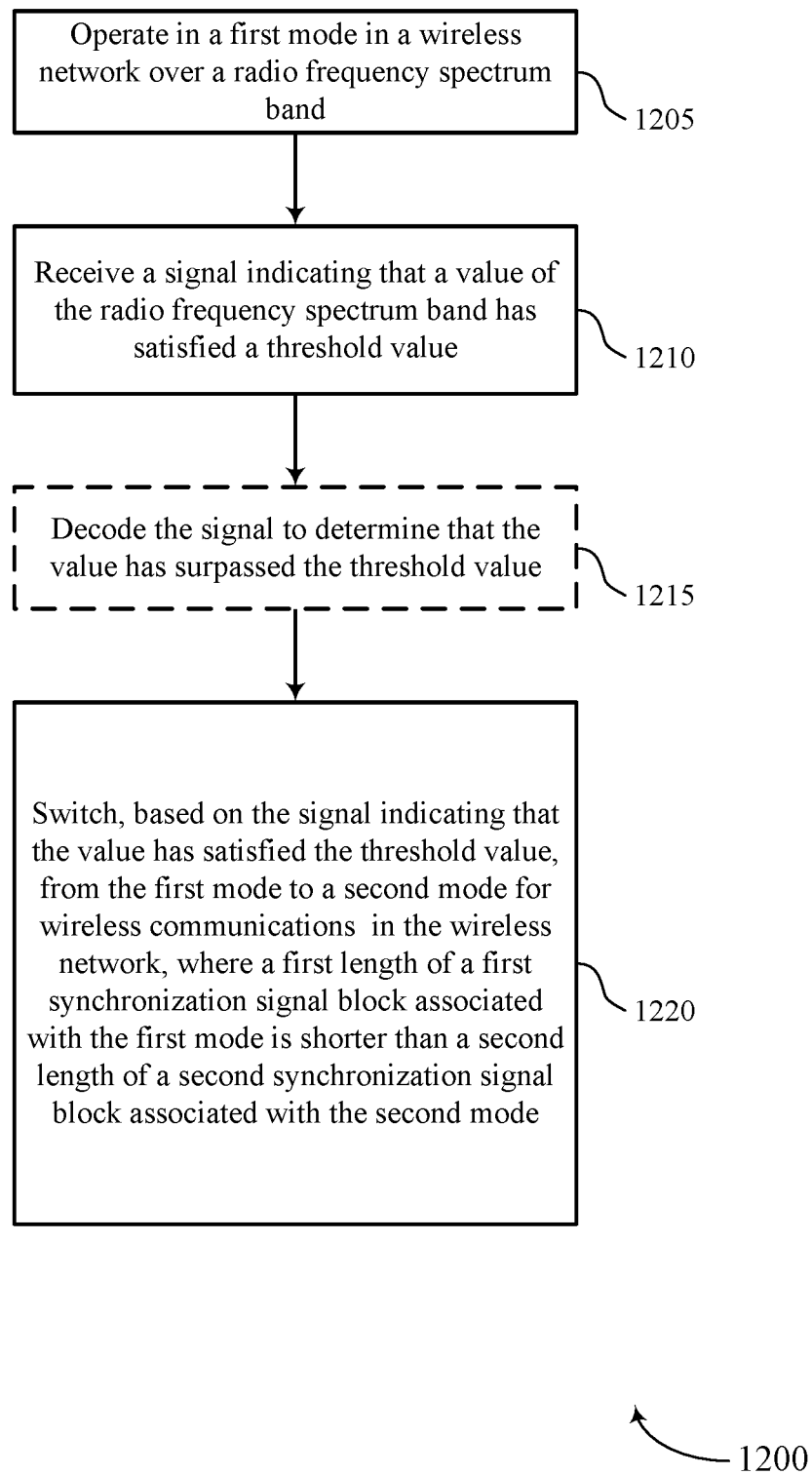

FIG. 12 shows a flowchart illustrating a method 1200 that supports use of a high pathloss mode, in accordance with one or more aspects of the present disclosure. The operations of method 1200 may be implemented by a UE 115 or base station 105 (e.g., a wireless device) or its components as described herein. For example, the operations of method 1200 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may operate in a first mode in a wireless network over a radio frequency spectrum band. The operations of 1205 may be performed according to the methods described herein. In some examples, aspects of the operations of 1205 may be performed by a pathloss mode manager as described with reference to FIGS. 5 through 9.

At 1210, the UE or base station may receive a signal indicating that a value of the radio frequency spectrum band has satisfied a threshold value. The operations of 1210 may be performed according to the methods described herein. In some examples, aspects of the operations of 1210 may be performed by a pathloss value threshold manager as described with reference to FIGS. 5 through 9.

At 1215, the UE or base station may decode the signal to determine that the value has surpassed the threshold value. The operations of 1215 may be performed according to the methods described herein. In some examples, aspects of the operations of 1215 may be performed by a pathloss mode indication manager as described with reference to FIGS. 5 through 9.

At 1220, the UE or base station may switch, based on the signal indicating that the value has satisfied the threshold value, from the first mode to a second mode for wireless communications in the wireless network, where a first length of a first SSB associated with the first mode is shorter than a second length of a second SSB associated with the second mode. The operations of 1220 may be performed according to the methods described herein. In some examples, aspects of the operations of 1220 may be performed by a pathloss mode switching manager as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

Example 1: A method for wireless communications at a wireless device, comprising: operating in a first mode in a wireless network over a radio frequency spectrum band; receiving a signal indicating that a value of the radio frequency spectrum band has satisfied a threshold value; and switching, based at least in part on the signal indicating that the value has satisfied the threshold value, from the first mode to a second mode for wireless communications in the wireless network, wherein a first length of a first synchronization signal block associated with the first mode is shorter than a second length of a second synchronization signal block associated with the second mode.

Example 2: The method of example 1, wherein the wireless network comprises an integrated access and backhaul (IAB) network.

Example 3: The method of example 2, further comprising: performing wireless backhaul communications with a second wireless device of the TAB network according to the second mode.

Example 4: The method of example 3, further comprising: performing wireless backhaul communications with a third wireless device of the TAB network according to the first pathloss mode or the second pathloss mode.

Example 5: The method of any of examples 1 to 4, wherein the value comprises a pathloss value and the threshold value comprises a threshold pathloss value.

Example 6: The method of example 5, further comprising: determining that the signal was received at a received power level below a threshold level, wherein the signal being received at the received power level below the threshold level indicates that the pathloss value has surpassed the threshold pathloss value.

Example 7: The method of any of examples 1 to 6, further comprising: transmitting an indication to one or more other wireless devices that the wireless device has switched to the second mode.

Example 8: The method of any of examples 1 to 7, further comprising: decoding the signal to determine that the value has surpassed the threshold value.

Example 9: The method of any of examples 1 to 8, wherein the signal comprises at least one of an in-band signal, an out-of-band signal, a broadcast signal, a unicast signal, or a combination thereof.

Example 10: The method of any of examples 1 to 9, wherein a first length of a first reference signal associated with the first mode is shorter than a second length of a second reference signal associated with the second mode.

Example 11: The method of any of examples 1 to 10, wherein a first MCS associated with the first mode is higher than a second MCS associated with the second pathloss mode.

Example 12: The method of any of examples 1 to 11, wherein a first bandwidth associated with the first mode is wider than a second bandwidth associated with the second mode.

Example 13: The method of any of examples 1 to 12, wherein a first beam width associated with the first mode is narrower than a second beam width associated with the second mode.

Example 14: The method of any of examples 1 to 13, wherein the radio frequency spectrum band comprises an unlicensed radio frequency spectrum band.

Example 15: The method of any of examples 1 to 14, wherein the wireless network comprises a millimeter wave wireless network.

Example 16: An apparatus comprising at least one means for performing a method of any of examples 1 to 15.

Example 17: An apparatus for wireless communications comprising a processor; and memory coupled to the processor, the processor and memory configured to perform a method of any of examples 1 to 15.

Example 18: A non-transitory computer-readable medium storing code for wireless communications, the code comprising instructions executable by a processor to perform a method of any of examples 1 to 15.

Techniques described herein may be used for various wireless communication systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a wireless device, comprising:
one or more memories; and
one or more processors coupled with the one or more memories and configured to cause the wireless device to:
operate in a first pathloss mode in a wireless network over a radio frequency spectrum band;
receive a signal that indicates to switch from the first pathloss mode to a second pathloss mode; and
switch, based at least in part on the signal, from the first pathloss mode to the second pathloss mode for wireless communications in the wireless network, wherein a first bandwidth of a control channel associated with the first pathloss mode is different than a second bandwidth of the control channel associated with the second pathloss mode.

2. The apparatus of claim 1, the wireless network comprising an integrated access and backhaul (IAB) network.

3. The apparatus of claim 2, wherein the one or more processors are configured to cause the wireless device to:
perform wireless backhaul communications with a second wireless device of the IAB network according to the second pathloss mode.

4. The apparatus of claim 3, wherein the one or more processors are configured to cause the wireless device to:
perform wireless backhaul communications with a third wireless device of the IAB network according to the first pathloss mode or the second pathloss mode.

5. The apparatus of claim 1, wherein the signal identifies a pathloss value that satisfies a threshold pathloss value which indicates for the wireless device to switch from the first pathloss mode to the second pathloss mode.

6. The apparatus of claim 5, wherein the one or more processors are configured to cause the wireless device to:
determine the signal was received at a receive power level associated with a failure of the signal to satisfy the threshold pathloss value, wherein the signal received at the receive power level associated with the failure of the signal to satisfy the threshold pathloss value indicates to switch from the first pathloss mode to the second pathloss mode.

7. The apparatus of claim 1, wherein the one or more processors are configured to cause the wireless device to:
transmit an indication to one or more other wireless devices that the wireless device has switched to the second pathloss mode.

8. The apparatus of claim 1, the signal comprising at least one of an in-band signal, an out-of-band signal, a broadcast signal, a unicast signal, or a combination thereof.

9. The apparatus of claim 1, wherein a first length of a first reference signal associated with the first pathloss mode is shorter than a second length of a second reference signal associated with the second pathloss mode.

10. The apparatus of claim 1, wherein a first modulation and coding scheme (MCS) associated with the first pathloss mode is higher than a second MCS associated with the second pathloss mode.

11. The apparatus of claim 1, wherein a first beam width associated with the first pathloss mode is narrower than a second beam width associated with the second pathloss mode.

12. The apparatus of claim 1, the radio frequency spectrum band comprising an unlicensed radio frequency spectrum band.

13. The apparatus of claim 1, the wireless network comprising a millimeter wave wireless network.

14. The apparatus of claim 1, wherein the first bandwidth of the control channel associated with the first pathloss mode is wider than the second bandwidth of the control channel associated with the second pathloss mode.

15. An apparatus for wireless communications at a wireless device, comprising:
one or more memories; and
one or more processors coupled with the one or more memories and configured to cause the wireless device to:
operate in a first pathloss mode in a wireless network over a radio frequency spectrum band;
receive a signal that indicates to switch from the first pathloss mode to a second pathloss mode; and
switch, based at least in part on the signal, from the first pathloss mode to the second pathloss mode for wireless communications in the wireless network, wherein a first length of a first synchronization signal block associated with the first pathloss mode is different than a second length of a second synchronization signal block associated with the second pathloss mode.

16. The apparatus of claim 15, the wireless network comprising an integrated access and backhaul (IAB) network.

17. The apparatus of claim 16, wherein the one or more processors are configured to cause the wireless device to:
perform wireless backhaul communications with a second wireless device of the TAB network according to the second pathloss mode.

18. The apparatus of claim 17, wherein the one or more processors are configured to cause the wireless device to:
perform wireless backhaul communications with a third wireless device of the IAB network according to the first pathloss mode or the second pathloss mode.

19. The apparatus of claim 15, wherein the signal identifies a pathloss value that satisfies a threshold pathloss value which indicates for the wireless device to switch from the first pathloss mode to the second pathloss mode.

20. The apparatus of claim 19, wherein the one or more processors are configured to cause the wireless device to:
determine the signal was received at a receive power level associated with a failure of the signal to satisfy the threshold pathloss value, wherein the signal received at the receive power level associated with the failure of the signal to satisfy the threshold pathloss value indicates to switch from the first pathloss mode to the second pathloss mode.

21. The apparatus of claim 15, wherein the one or more processors are configured to cause the wireless device to:
transmit an indication to one or more other wireless devices that the wireless device has switched to the second pathloss mode.

22. The apparatus of claim 15, the signal comprising at least one of an in-band signal, an out-of-band signal, a broadcast signal, a unicast signal, or a combination thereof.

23. The apparatus of claim 15, wherein a first length of a first reference signal associated with the first pathloss mode is shorter than a second length of a second reference signal associated with the second pathloss mode.

24. The apparatus of claim 15, wherein a first modulation and coding scheme (MCS) associated with the first pathloss mode is higher than a second MCS associated with the second pathloss mode.

25. The apparatus of claim 15, wherein a first beam width associated with the first pathloss mode is narrower than a second beam width associated with the second pathloss mode.

26. The apparatus of claim 15, the radio frequency spectrum band comprising an unlicensed radio frequency spectrum band.

27. The apparatus of claim 15, the wireless network comprising a millimeter wave wireless network.

28. The apparatus of claim 15, wherein the first length of the first synchronization signal block associated with the first pathloss mode is shorter than the second length of the second synchronization signal block associated with the second pathloss mode.

29. A method for wireless communications at a wireless device, comprising:
operating in a first pathloss mode in a wireless network over a radio frequency spectrum band;
receiving a signal indicating to switch from the first pathloss mode to a second pathloss mode; and
switching, based at least in part on the signal, from the first pathloss mode to the second pathloss mode for wireless communications in the wireless network, wherein a first bandwidth of a control channel associated with the first pathloss mode is different than a second bandwidth of the control channel associated with the second pathloss mode.

30. The method of claim 29, the wireless network comprising an integrated access and backhaul (IAB) network.

31. The method of claim 30, further comprising:
performing wireless backhaul communications with a second wireless device of the IAB network according to the second pathloss mode.

32. The method of claim 31, further comprising:
performing wireless backhaul communications with a third wireless device of the IAB network according to the first pathloss mode or the second pathloss mode.

33. The method of claim 29, wherein the signal identifies a pathloss value that satisfies a threshold pathloss value which indicates for the wireless device to switch from the first pathloss mode to the second pathloss mode.

34. The method of claim 33, further comprising:
determining the signal was received at a receive power level associated with a failure of the signal to satisfy the threshold pathloss value, wherein the signal received at the receive power level associated with the failure of the signal to satisfy the threshold pathloss value indicates to switch from the first pathloss mode to the second pathloss mode.

35. The method of claim 29, further comprising:
transmitting an indication to one or more other wireless devices that the wireless device has switched to the second pathloss mode.

36. The method of claim 29, the signal comprising at least one of an in-band signal, an out-of-band signal, a broadcast signal, a unicast signal, or a combination thereof.

37. The method of claim 29, wherein a first length of a first reference signal associated with the first pathloss mode is shorter than a second length of a second reference signal associated with the second pathloss mode.

38. The method of claim 29, wherein a first modulation and coding scheme (MCS) associated with the first pathloss mode is higher than a second MCS associated with the second pathloss mode.

39. The method of claim 29, wherein a first beam width associated with the first pathloss mode is narrower than a second beam width associated with the second pathloss mode.

40. The method of claim 29, the radio frequency spectrum band comprising an unlicensed radio frequency spectrum band.

41. The method of claim 29, the wireless network comprising a millimeter wave wireless network.

42. The method of claim 29, wherein the first bandwidth of the control channel associated with the first pathloss mode is wider than the second bandwidth of the control channel associated with the second pathloss mode.

43. A method for wireless communications at a wireless device, comprising:
operating in a first pathloss mode in a wireless network over a radio frequency spectrum band;
receiving a signal indicating to switch from the first pathloss mode to a second pathloss mode; and
switching, based at least in part on the signal, from the first pathloss mode to the second pathloss mode for wireless communications in the wireless network, wherein a first length of a first synchronization signal block associated with the first pathloss mode is different than a second length of a second synchronization signal block associated with the second pathloss mode.

44. The method of claim 43, the wireless network comprising an integrated access and backhaul (IAB) network.

45. The method of claim 44, further comprising:
performing wireless backhaul communications with a second wireless device of the IAB network according to the second pathloss mode.

46. The method of claim 45, further comprising:
performing wireless backhaul communications with a third wireless device of the IAB network according to the first pathloss mode or the second pathloss mode.

47. The method of claim 43, wherein the signal identifies a pathloss value that satisfies a threshold pathloss value which indicates for the wireless device to switch from the first pathloss mode to the second pathloss mode.

48. The method of claim 47, further comprising:
determining the signal was received at a receive power level associated with a failure of the signal to satisfy the threshold pathloss value, wherein the signal received at the receive power level associated with the failure of the signal to satisfy the threshold pathloss value indicates to switch from the first pathloss mode to the second pathloss mode.

49. The method of claim 43, further comprising:
transmitting an indication to one or more other wireless devices that the wireless device has switched to the second pathloss mode.

50. The method of claim 43, the signal comprising at least one of an in-band signal, an out-of-band signal, a broadcast signal, a unicast signal, or a combination thereof.

51. The method of claim 43, wherein a first length of a first reference signal associated with the first pathloss mode is shorter than a second length of a second reference signal associated with the second pathloss mode.

52. The method of claim 43, wherein a first modulation and coding scheme (MCS) associated with the first pathloss mode is higher than a second MCS associated with the second pathloss mode.

53. The method of claim 43, wherein a first beam width associated with the first pathloss mode is narrower than a second beam width associated with the second pathloss mode.

54. The method of claim 43, the radio frequency spectrum band comprising an unlicensed radio frequency spectrum band.

55. The method of claim 43, the wireless network comprising a millimeter wave wireless network.

56. The method of claim 43, wherein the first length of the first synchronization signal block associated with the first pathloss mode is shorter than the second length of the second synchronization signal block associated with the second pathloss mode.

57. A non-transitory computer-readable medium storing code for wireless communications at a wireless device, the code comprising instructions executable by one or more processors to cause the wireless device to:
operate in a first pathloss mode in a wireless network over a radio frequency spectrum band;

receive a signal indicating to switch from the first pathloss mode to a second pathloss mode; and switch, based at least in part on the signal, from the first pathloss mode to the second pathloss mode for wireless communications in the wireless network, wherein a first bandwidth of a control channel associated with the first pathloss mode is different than a second bandwidth of the control channel associated with the second pathloss mode.

58. A non-transitory computer-readable medium storing code for wireless communications at a wireless device, the code comprising instructions executable by one or more processors to cause the wireless device to:

operate in a first pathloss mode in a wireless network over a radio frequency spectrum band;

receive a signal indicating to switch from the first pathloss mode to a second pathloss mode; and switch, based at least in part on the signal, from the first pathloss mode to the second pathloss mode for wireless communications in the wireless network, wherein a first length of a first synchronization signal block associated with the first pathloss mode is different than a second length of a second synchronization signal block associated with the second pathloss mode.

* * * * *